(12) United States Patent
DenHerder et al.

(10) Patent No.: US 12,459,145 B2
(45) Date of Patent: Nov. 4, 2025

(54) CAST IRON PIPE CUTTER

(71) Applicants: Scott DenHerder, Bakersfield, CA (US); Marc Lundgren, Bakersfield, CA (US)

(72) Inventors: Scott DenHerder, Bakersfield, CA (US); Marc Lundgren, Bakersfield, CA (US)

(*) Notice: Subject to any disclaimer, the term of this patent is extended or adjusted under 35 U.S.C. 154(b) by 0 days.

(21) Appl. No.: 17/336,083

(22) Filed: Jun. 1, 2021

(65) Prior Publication Data
US 2021/0370538 A1  Dec. 2, 2021

Related U.S. Application Data

(60) Provisional application No. 63/032,242, filed on May 29, 2020.

(51) Int. Cl.
| | | |
|---|---|---|
| *B26D 3/16* | (2006.01) | |
| *B26D 1/00* | (2006.01) | |
| *B26D 1/03* | (2006.01) | |
| *B26D 1/09* | (2006.01) | |

(52) U.S. Cl.
CPC ............. *B26D 3/16* (2013.01); *B26D 1/0006* (2013.01); *B26D 1/03* (2013.01); *B26D 1/09* (2013.01); *B26D 2001/006* (2013.01)

(58) Field of Classification Search
CPC .......... B26D 3/16; B26D 1/0006; B26D 1/03; B26D 1/09; B26D 2001/006; B26D 1/06; B26D 5/12; B26D 2001/0053; B23D 21/08; B23D 35/001; B23D 21/00; B23D 31/002
See application file for complete search history.

(56) References Cited

U.S. PATENT DOCUMENTS

| | | | | |
|---|---|---|---|---|
| 52,715 A | * | 2/1866 | Howarth ................ | B23D 21/08 30/102 |
| 1,322,007 A | * | 11/1919 | Golding ................ | B23D 21/10 30/94 |
| 2,747,275 A | * | 5/1956 | Johannson ............ | B23D 21/08 30/101 |
| 2,851,773 A | * | 9/1958 | Jennison ............... | B23D 21/08 225/103 |
| 2,862,295 A | * | 12/1958 | Harding ................ | B23D 21/08 30/100 |
| 2,888,743 A | * | 6/1959 | Arnes .................... | B23D 21/08 30/101 |

(Continued)

FOREIGN PATENT DOCUMENTS

GB       220596 A    * 12/1924

*Primary Examiner* — Jonathan G Riley
(74) *Attorney, Agent, or Firm* — James M. Duncan; Young Wooldridge LLP

(57) ABSTRACT

The present invention is a cast iron pipe cutter. The cast iron pipe cutter includes a movable upper cutting tool and a rigid lower cutting tool. The upper cutting tool and lower cutting tool includes multiple cutting disc spaced an arc length apart. As the upper cutting tool is advanced downward by a hydraulic press, the cutting discs apply increasing pressure to the outer surface of a cast iron pipe until each cutting discs in the upper cutting tool and the lower cutting tool creates a fracture in the cast iron pipe. The multiple fractures created by the cutting discs amalgamate into a single fracture and the cast iron pipe is cut almost instantaneously.

16 Claims, 22 Drawing Sheets

(56) References Cited

U.S. PATENT DOCUMENTS

| | | | | |
|---|---|---|---|---|
| 3,098,296 | A * | 7/1963 | Petersen | B23D 21/10 30/100 |
| 4,126,064 | A * | 11/1978 | Tarrant | B23B 5/16 72/70 |
| 4,279,181 | A * | 7/1981 | Birkestrand | B23D 21/00 82/71 |
| 4,535,924 | A * | 8/1985 | Quinn | B23D 21/06 269/297 |
| 5,800,022 | A * | 9/1998 | Del Rosario | A63C 17/06 403/348 |
| 7,024,779 | B1 * | 4/2006 | Wright | B23D 49/167 30/375 |
| 2002/0007514 | A1 * | 1/2002 | Dole | B23B 5/168 7/157 |
| 2003/0079349 | A1 * | 5/2003 | Merle | B23B 5/16 30/95 |
| 2007/0068080 | A1 * | 3/2007 | Vigdorovich | B23Q 11/0891 49/130 |
| 2009/0049697 | A1 * | 2/2009 | Williams | B23D 21/08 83/13 |
| 2012/0279366 | A1 * | 11/2012 | Tjader | B23D 21/08 30/96 |
| 2014/0150266 | A1 * | 6/2014 | Priha | B23D 21/08 29/592 |
| 2017/0282263 | A1 * | 10/2017 | Khoury | B23D 31/008 |

* cited by examiner

CAST IRON PIPE CUTTER

The present invention relates generally to cutting equipment. The present invention relates particularly, though not exclusively, to cast iron cutting equipment. The present invention is, though not exclusively, a cast iron pipe cutter. The present application claims priority to Provisional Patent Application No. 63/032,242, filed on May 29, 2020.

FIELD OF INVENTION

Background of the Invention

Cast irons are a group of iron alloys with carbon content generally in the range of 2% to 4%. The higher carbon content of cast iron results in a heterogeneous alloy with more than one microcrystalline structure present in the material. Due to its unique microcrystalline structure, cast iron has unique physical properties. Generally, cast irons have high compressive strength, high hardness, high toughness, resistance to deformation, resistance to oxidation, resistance to wear, and a low melting point. The low melting point and high carbon content provides the molten form of cast irons good fluidity and castability. Due to the physical properties of cast irons and ease of castability, cast irons are still widely used today to create pipes.

Cast iron pipes are manufactured and used today due to its low cost of manufacture. Cast iron pipes offer durability, high wear resistance, resistance to deformation, resistance to oxidation, and high compressive strength, among other properties. However, cast irons have low tensile strength, low ductility, and are brittle. Also, due to the toughness and hardness of cast irons, cutting cast iron pipe with traditional cutting equipment is time consuming. The wear and tear on traditional cutting equipment also makes it costly as blades and cutting discs quickly wear. Additionally, cutting cast iron pipes at a work site with traditional cutting equipment increases the cost of a project by using valuable work and equipment time. An alternative to traditional cutting equipment is the chain pipe cutter.

Chain pipe cutters have a chain link assembly with a cutter wheel at each chain link pin. The first end of the chain link assembly is rigidly attached and the second end of the chain link assembly is removably attached to accommodate different types of pipe diameters. To cut a cast iron pipe, the chain link assembly is wrapped around a pipe and adjusted to the diameter of the pipe with all of the cutter wheels contacting the surface of the pipe simultaneously. Once adjusted, the second end of the chain link assembly is locked in place and the second end of the chain link assembly is advanced towards the first end of the chain link assembly to incrementally decrease the diameter of the locked chain link assembly. By decreasing the diameter of the locked chain link assembly, each cutting wheel applies pressure to the pipe. Due to the low ductility, brittleness, and non-malleable nature of cast iron pipes, the applied pressure fractures and snaps the pipe.

Although the chain pipe cutter decreases cutting time compared to traditional cutting equipment, the chain pipe cutter still has disadvantages. By utilizing the same chain assembly for multiple diameters of pipe, the chain piper cutter cannot make clean straight cuts for all pipe diameters. Chain pipe cutters are susceptible to oblique cuts with rough edges. Additionally, the chain pipe cutters occasionally destroy the cast iron pipes being cut creating waste and taking up more valuable work hours to replace or repair the broken cast iron pipe. Chain pipe cutters are bulky and require significant clearance area for use at a work site and still require a significant time from set up to making a cut. In addition, use of traditional chain pipe cutters requires the worker to strain and pull leverage, exposing the user to possible injury.

In light of the above, it would be advantageous to provide a cast iron pipe cutter capable of quick and easy cutting of cast iron pipe. It would further be advantageous to provide a cast iron pipe cutter capable of making straight cuts. It would further be advantageous to provide a cast iron pipe designed specifically for each pipe size for cleaner cuts. It would further be advantageous to provide a cast iron pipe cutter capable of decreasing the cutting time and minimizing component wear.

SUMMARY OF INVENTION

The present invention is a cast iron pipe cutter capable of consistently creating straight clean cuts in a variety of cast iron pipes in minimal time. The cast iron pipe cutter of the present invention is further capable of cutting different size cast iron pipes while maintaining the ability to create straighter clean cuts. Further, the cast iron pipe cutter requires minimal effort from the user to operate, creating a much safer environment for the operator/user. The straight clean cuts created by the cast iron pipe cutter are consistent, repeatable, and mechanical. As a result, the cast iron pipe cutter of the present invention is optimal for factory use, enabling precutting of cast iron pipe to specified lengths thereby eliminating the need to make cuts in the field.

In the present invention, the cast iron pipe cutter includes a hydraulic cutter contained in a cabinet. A feeder rack feeds cast iron pipe into the cabinet and into the hydraulic cutter. The hydraulic cutter cuts the cast iron pipe and drops the cut piece or cast iron pipe into a collection tray. As an uncut portion of cast iron pipe is fed into the cabinet and into the hydraulic cutter, the uncut portion of cast iron pipe forces the cut cast iron pipe out of the cabinet in a receiving tray to be received. The cabinet houses all of the moving components of the cast iron pipe cutter and serves as a barrier to protect users from the moving parts when in use. Additionally, the cabinet protects the user by containing any flying debris to within the interior of the cabinet.

The hydraulic cutter cuts cast iron pipe by applying pressure to the outer surface of the cast iron pipe at multiple points along the outer circumference of the cast iron pipe in a sequential process until the fractures grow and amalgamates into a single fracture, thus cutting the cast iron pipe. The hydraulic cutter has a movable upper cutting tool and a stationary lower cutting tool. The movable upper cutting tool is connected to an upper pressure plate connected to a hydraulic press capable of providing the required pressure to fracture the cast iron pipes. The pressure plate evenly distributes the pressure created by the hydraulic press across the movable upper cutting tool. The lower cutting tool is connected to a lower pressure plate and is held rigidly in place. The lower pressure plate is capable of handling the pressure created by the hydraulic press.

The upper cutting tool and the lower cutting tool include multiple cutting discs utilized to apply pressure normal to the surface of the cast iron pipe. The diameter of the cast iron pipe to be cut dictates the quantity of cuttings discs, the dimensions of each cutting disc, and the spacing between each cutting disc. Different upper cutting tools and lower cutting tools are used for different sized cast iron pipes in order to properly control the fracture during cutting. The upper cutting tool includes two substantially similar plates attached together a distance apart to create a gap between the two plates. Each plate is substantially similar and includes a first curved edge, side edges, and an upper cutting tool cutting disc support. Multiple cutting discs are attached to the upper cutting tool cutting disc support utilizing multiple cutting disc pins with each cutting disc positioned an arc length and a center-to-center distance from an adjacent cutting disc, which is dictated by the diameter of the cast iron pipe to be cut.

Each cutting disc has a bearing surface to enable the cutting disc to rotate freely about the cutting disc pin. By ensuring the discs do not have a camber angle, the force that is applied by the cutting disc to the cast iron pipe is always normal to the exterior surface of the cast iron pipe. Alternatively, the cutting disc may be locked in place to ensure the force applied by the cutting disc to the cast iron pipe is applied at a specific point and direction.

Similarly, the lower cutting tool includes two substantially similar plates attached together a distance apart to create a gap between the two plates. Each plate is substantially similar and includes a first curved edge, side edges, and a lower cutting tool cutting disc support. Multiple cutting discs are attached to the lower cutting tool cutting disc support utilizing multiple cutting disc pins with each cutting disc positioned an arc length and center-to-center distance from an adjacent cutting disc, which is dictated by the diameter of the cast iron pipe to be cut. Each cutting disc has a bearing surface to enable the cutting disc to rotate freely about the cutting disc pin. The cutting disc may also be locked in place. The lower cutting tool and upper cutting tool includes multiple cutting discs spaced apart to promote the controlled fracturing, and its growth, of the cast iron pipes.

The cutting discs of the lower cutting tool and upper cutting tool, when in position to cut a cast iron pipe, are inscribed in a contact point circle with a diameter smaller than the outside diameter of the cast iron pipe to be cut. The contact point circle is $30/1000^{th}$ smaller than the diameter of the cast iron pipe to be cut, which controls the sequence of creating fractures along the curved outer surface of the cast iron pipe to be cut. As the upper cutting tool is advanced downward, the outermost cutting discs on the upper cutting tool apply initial pressure to the outer curved surface of the cast iron pipe until each of the outermost cutting discs begins to form a fracture in the cast iron pipe. Due to the unique microcrystalline structure of cast irons, the fracture begins to develop along the graphite precipitate present in the iron matrix of the cast iron as the pressure is increased.

As the fracture begins to form from the two outermost cutting discs, the subsequent cutting discs inwards of the two outermost cutting discs apply increasing pressure to the outer curved surface of the cast iron pipe until each of the subsequent cutting discs begin to form a fracture in the cast iron pipe; simultaneously as the fracture begins to form from the subsequent cutting discs, the fractures from the outermost cutting discs is fully formed and grows until it amalgamates with the growing fracture of the subsequent cutting discs. The formation, growth, and amalgamation of the fractures proceed in a sequential order starting from the outermost cutting discs and meets at the innermost cutting discs of the upper cutting tool. Similarly, and simultaneously, the lower cutting tool forms, grows, and amalgamates fractures in a sequential order starting from the outermost cutting discs and meeting at the innermost cutting discs of the lower cutting tool. By creating and growing multiple fractures at specific arc lengths and center-to-center distances apart, the growth of the fractures are controlled and utilized. The multiple fractures amalgamate into a single fracture and the cast iron pipe is cut extremely quickly.

BRIEF DESCRIPTION OF THE FIGURES

The objects, features, and advantages of the invention will be more clearly perceived from the following detailed description, when read in conjunction with the accompanying drawing, in which.

DETAILED DESCRIPTION OF THE INVENTION

Figure 1:
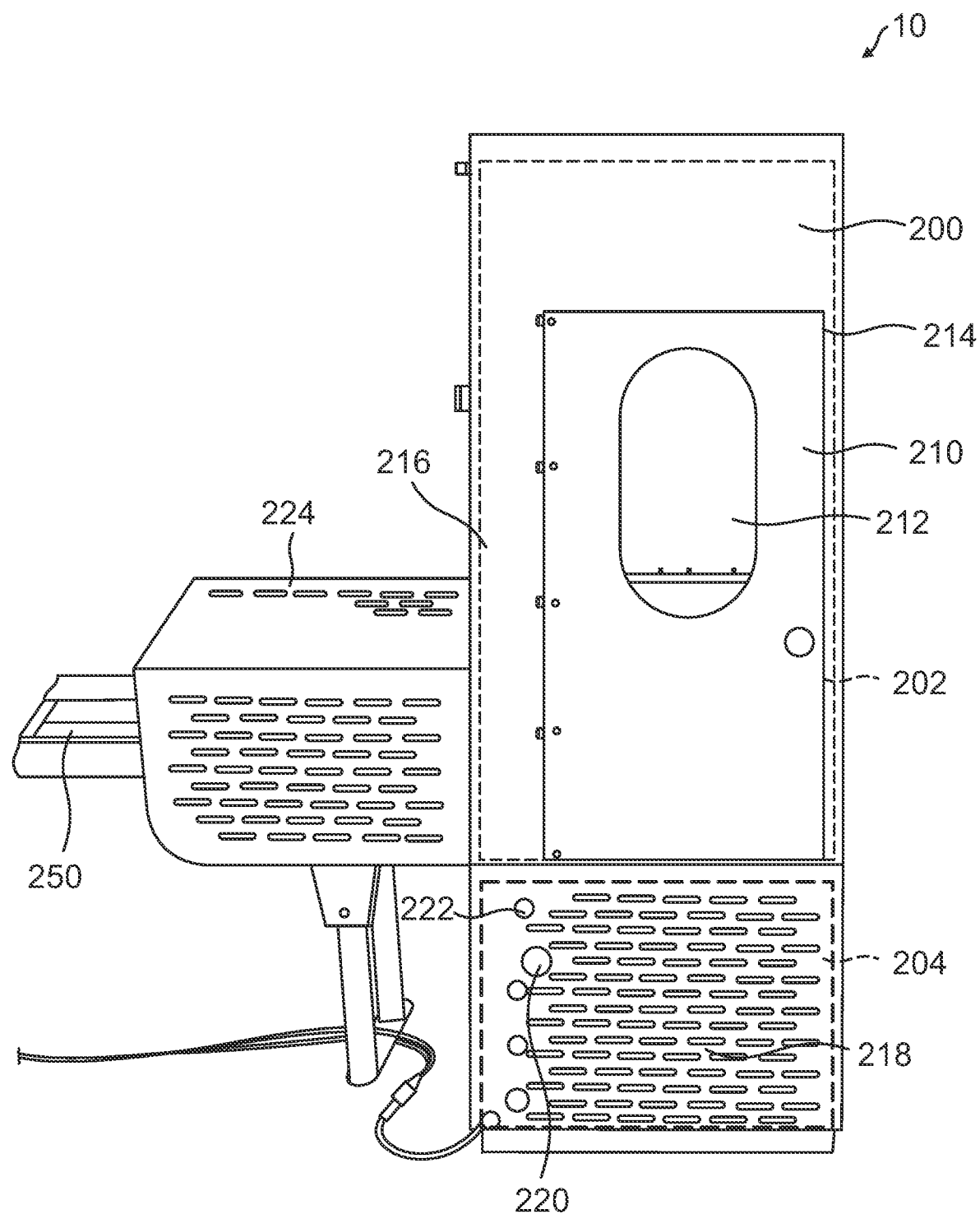
FIG. 1 is perspective view of an embodiment of the present invention, a cast iron pipe cutter having a hydraulic cutter located within a cabinet with a feeding rack to feed cast iron pipe into the cast iron pipe cutter to be cut.

Referring initially to FIG. 1, a perspective view of a cast iron pipe cutter of the present invention is shown and generally designated 10. The cast iron pipe cutter 10 takes advantage of the physical properties of cast iron to make straight clean cuts quickly and consistently. Generally, the microcrystalline structures of different cast irons include a precipitate of carbon as a flake or spherical nodule surrounded by an iron matrix. The precipitate of carbon, such as graphite or carbide, present in the iron matrix creates localized spots in the cast iron that tend to form fractures. The cast iron pipe cutter 10 applies pressure on the exterior of the cast iron pipe to promote the formation of these fractures. By creating multiple fractures simultaneously at specific locations and forming subsequent fractures sequentially along the exterior of the cast iron pipe, the fractures develop and grow at a controlled rate and in a controlled direction. The multiple fractures amalgamate into a single fracture and the cast iron pipe is cut. The formation of the individual fractures to the amalgamation of all of the individual fractures occur almost instantaneously.

In the present invention, the cast iron pipe cutter 10 includes a hydraulic cutting tool 100 (shown in FIG. 2) contained in a cabinet 200. A feed rack 250 feeds cast iron pipe into the cabinet 200 and into the hydraulic cutting tool 100. The hydraulic cutter 100 (also referred herein as hydraulic cutting tool 100) cuts the cast iron pipe, which is temporarily stored in the cabinet 200 until the next portion of cast iron pipe to be cut is fed into the cabinet 200 and to the hydraulic cutting tool 100. As the next portion of cast iron pipe is fed into the cabinet 200 and into the hydraulic cutter 100, the new portion of cast iron pipe forces the cut cast iron pipe out of the cabinet 200 and onto a parts table to be received. The cabinet 200 houses all of the components of the cast iron pipe cutter 10 and serves as a barrier to protect users from the hydraulic cutting tool 100 as the cast iron pipe cutter 10 is in use. Additionally, the cabinet 200 protects the user by containing any flying debris to within the interior of the cabinet 200.

The cabinet 200 is a rectangular cabinet with a work space 202 (shown in dashed lines) and a machine space 204 (shown in dashed lines). The work space 202 houses the moving components of the hydraulic cutting tool 100 and the machine space 204 houses the mechanical and electrical components of the hydraulic cutting tool 100. A side access door 210 with a side access door window 212 is formed on the side of the cabinet 200. The side access door window 212 provides a shatter proof viewing window so a user can see and monitor the operation of the hydraulic cutting tool 100. The side access door 210 is fitted with a safety switch 214. The safety switch 214 monitors the status of the side access door 210 and does not allow operation of the cast iron pipe cutter 10 when the side access door 210 is open. Adjacent to the side access door 210 on the cabinet 200 is an operation control panel 216 for the manual operation of the hydraulic cutting tool 100.

Louvers 218 are formed in the lower portion of the cabinet 200. The louvers 218 provided proper ventilation to the machine space 204 to maintain the machine and electrical components of the hydraulic cutting tool 100 at proper operation temperatures. A pressure gauge 220 is adjacent to the louvers 218 and provides a manual readout of the current pressure of the hydraulic cutting tool 100. A main control panel 222 is located above the pressure gauge 220 and controls the main power to the cast iron pipe cutter 10. Extending from the front of the cabinet 200 is a feed rack protector 224 covering the section of the feed rack 250 adjacent to the hydraulic cutting tool 100. The feed rack protector 224 provides a barrier to ensure a user is adequately spaced from the hydraulic cutting tool 100 when feeding a cast iron pipe into the cabinet 200.

Figure 2:
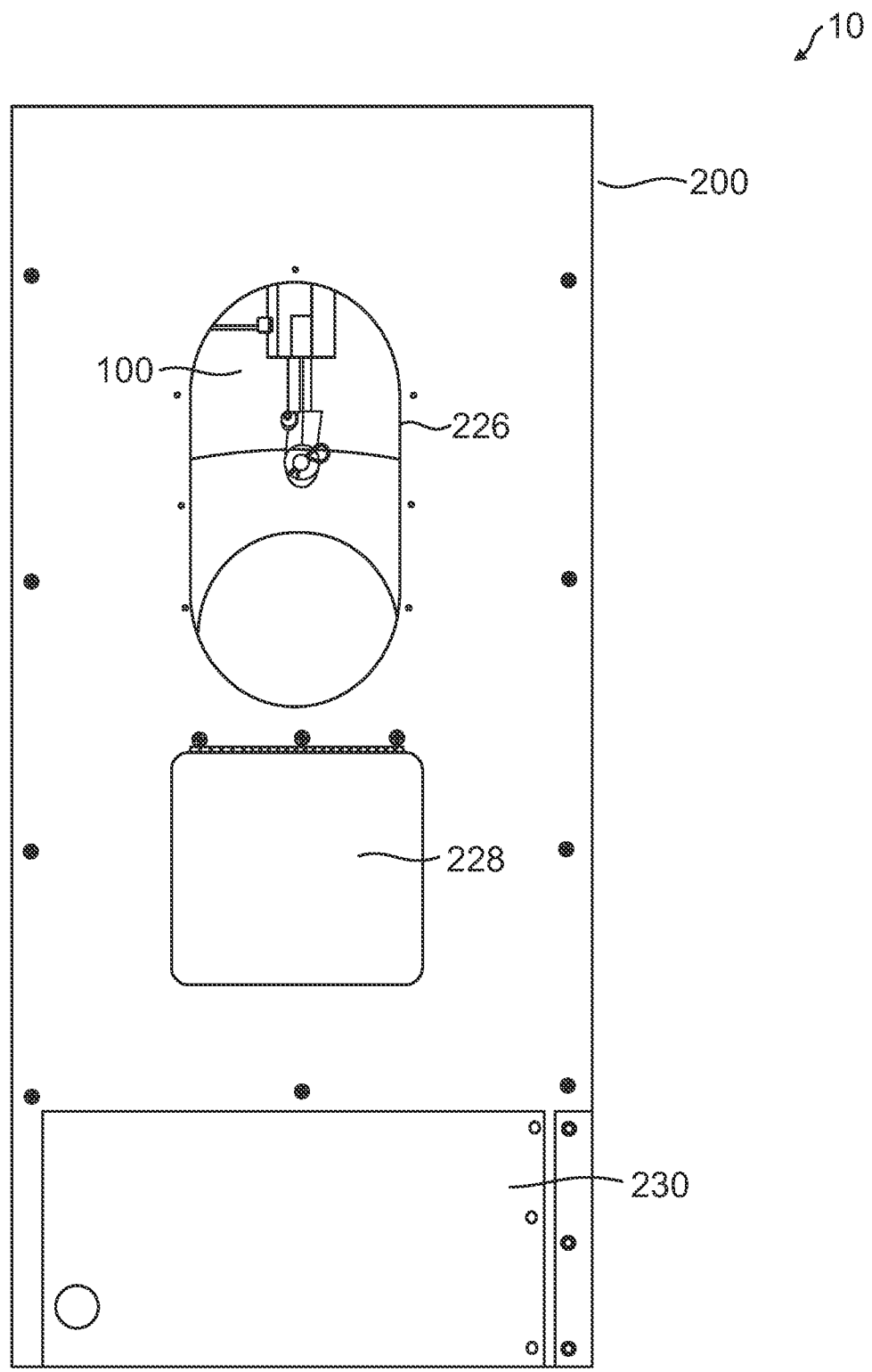
FIG. 2 is a rear view of the cast iron pipe cutter.

Referring now to FIG. 2, a rear view of the cabinet 200 of the cast iron pipe cutter 10 is shown. At the rear of the cabinet 200, a rear access window 226 is formed to provide a shatter proof viewing window so a user can see and monitor the operation of the cast iron pipe cutter 10 at a different vantage point than from the side access door window 212. Below the rear access window 226 is an extraction door 228. The extraction door 228 is located rearward of the hydraulic cutting tool 100 and at the opposite end of the feed rack 250. Cut cast iron pipe is extracted from the extraction door 228. It is contemplated that the parts table may abut the cabinet 200 at the extraction door 228 to receive the cut cast iron pipes. Below the extraction door 228 is a machine space access panel 230 to provide access into the machine space 204 of the cabinet 200.

Figure 3:
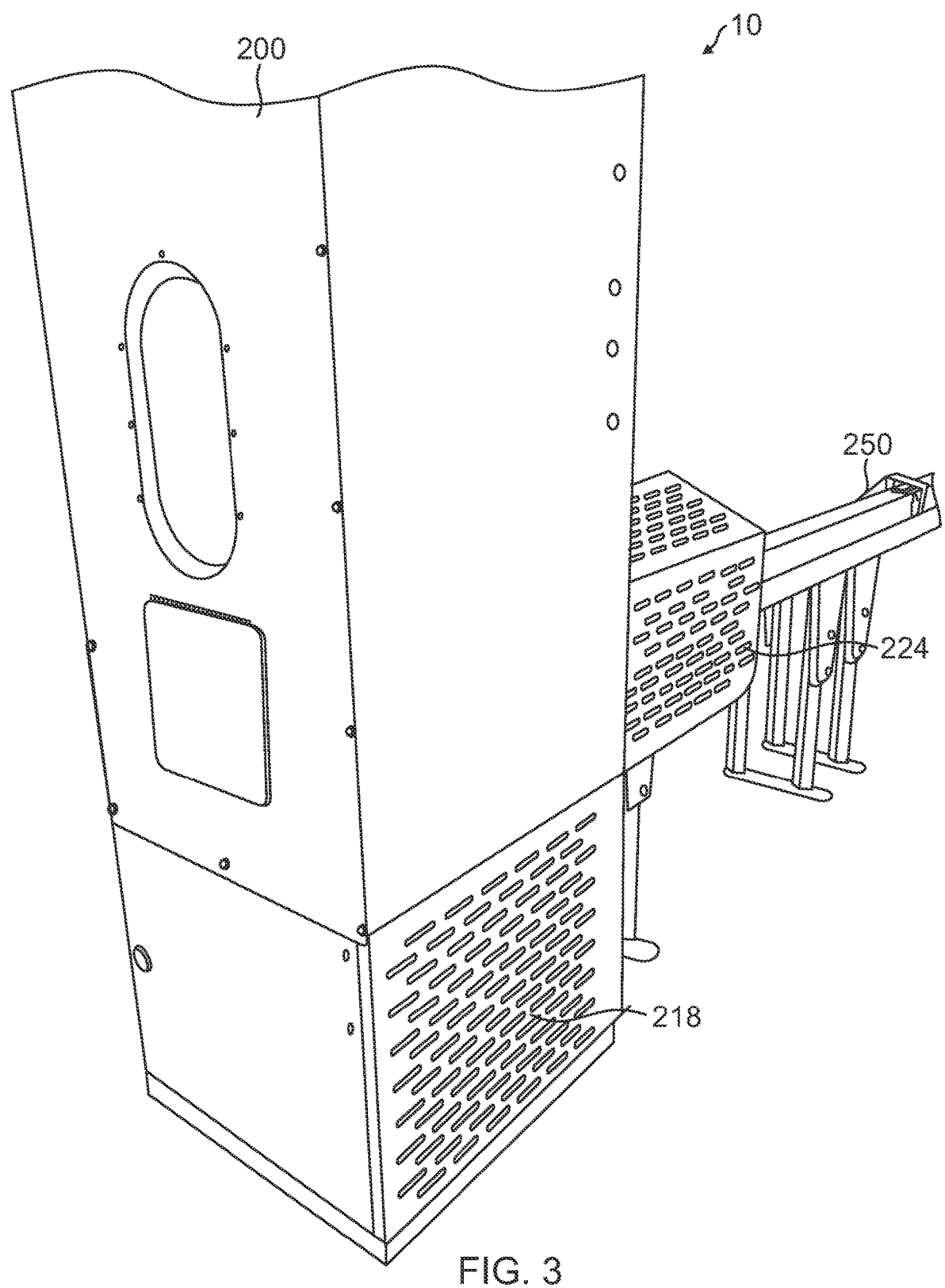
FIG. 3 is a rear perspective view of the cast iron pipe cutter.

Referring now to FIG. 3, a rear perspective view of the cast iron pipe cutter 10 of the present invention is shown. The cabinet 200 includes a solid wall in the work space 202 to increase the rigidity of the cabinet 200. The louvers 218 are formed on opposite sides of the machine space 204 of the cabinet 200 to promote airflow through the machine space 204.

Figure 4:
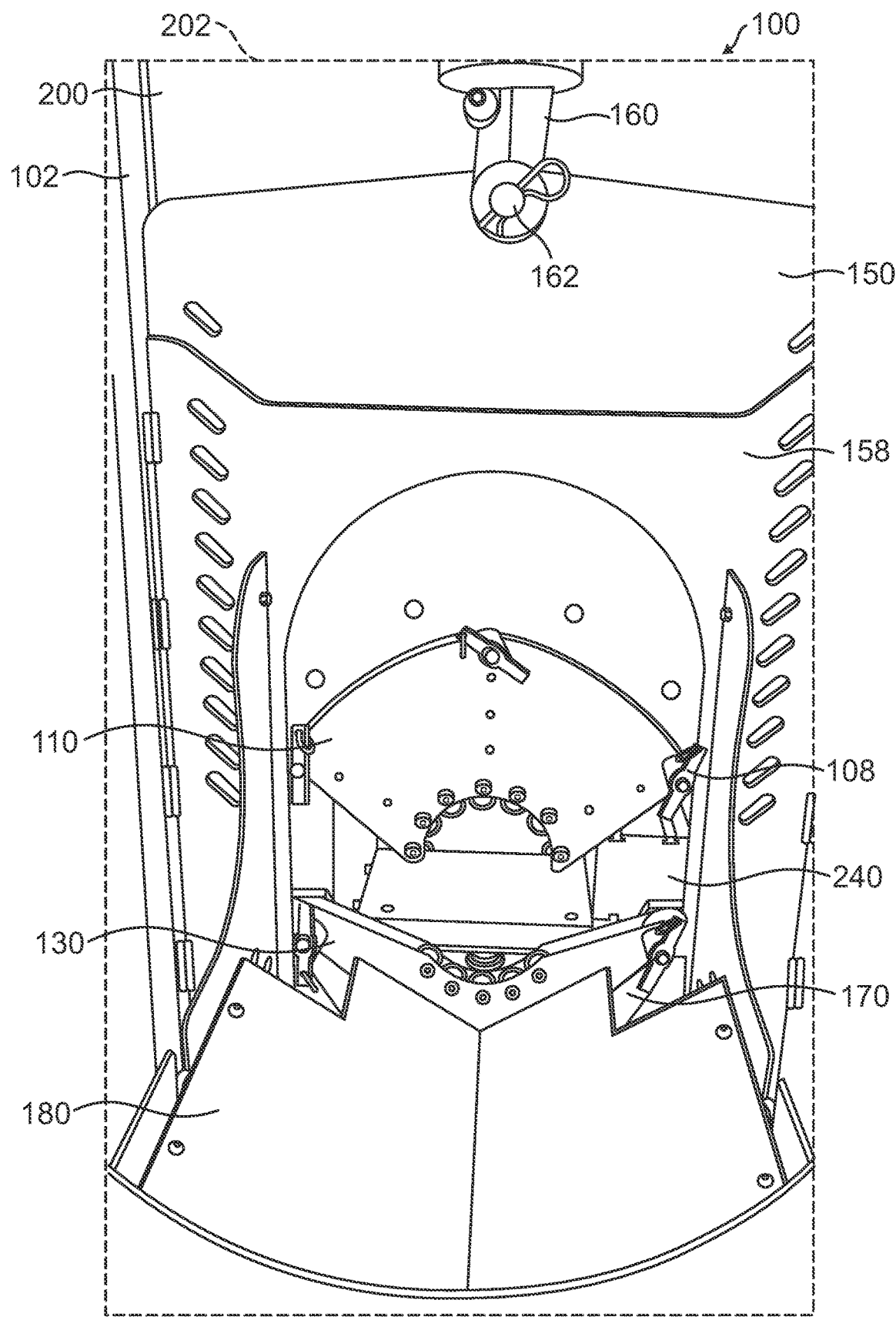
FIG. 4 is a front elevation view of the hydraulic cutter located inside of the cabinet.

Referring now to FIG. 4, a rear view of the hydraulic cutting tool 100 located within the working space 202 of the cabinet 200 is shown. The cabinet 200 is attached to and encloses a frame 102. The electronic controls 104 (not shown in the figure) are located within the machine space 204 of the cabinet 200 and include the necessary electronic hardware, and software if desired, to operate the hydraulic cutting tool 100. The hydraulic cutting tool 100 has a movable upper cutting tool 110 and a stationary lower cutting tool 130. The movable upper cutting tool 110 is connected to an upper pressure plate 150 placed within an upper pressure plate guide 158 and attached to a hydraulic press 160. The lower cutting tool 130 is attached to a lower pressure plate 170, which is held rigidly in place and is capable of handling the pressure created by the hydraulic press 160. A catch tray 180 is located adjacent to the lower cutting tool 130 to receive cut portions of cast iron pipe. Opposite the catch tray 180 is an insertion opening 240 to receive cast iron from the feed rack 250.

The hydraulic cutting tool 100 applies pressure evenly to the outer surface of a cast iron pipe at multiple points along the circumference to create multiple controlled fracture formations along the circumference of the cast iron pipe and forming subsequent fractures sequentially along the exterior of the cast iron pipe until the fractures grow and amalgamate into a single fracture, thus cutting the cast iron pipe. The hydraulic press 160 provides the necessary force to create fractures in the cast iron pipe. The hydraulic press 160 is controlled by the operation control panel 216, and the electronic controls 104. The hydraulic press 160 moves along a single axis oriented substantially vertical to ensure that the majority of the pressure produced by the hydraulic press 160 is applied vertically to the upper pressure plate 150. By using a pin connection 162, any torque is minimized.

The pressure created by the hydraulic press 160 is transferred to the upper cutting tool 110 through the use of the upper pressure plate 150. The hydraulic press 160 is preferably capable of producing between 200 PSI and 1400 PSI of pressure. The upper pressure plate 150 receives the pressure created by hydraulic press 160 at a single point and applies it to the upper cutting tool 110 at three evenly spaced points. By applying the force at three points instead of one, the forces are substantially evenly distributed across the entire width of the upper cutting tool 110. The upper pressure plate guide 158 restrains the movement of the upper pressure plate 150 vertically to ensure that the majority of the force produced by the hydraulic press 160 is applied to the upper cutting tool 110. By using T-pin connectors 108 to connect the upper cutting tool 110 to the upper pressure plate 150, any torque is minimized.

The lower pressure plate 170 is rigidly attached to the frame 102 and is designed to withstand the forces of the hydraulic press 160. The lower cutting tool 130 is attached to the lower pressure plate 170 with the T-pin connectors 108 and is configured to remain fixed. The distribution of forces across multiple T-pin connectors 108 reduces the stresses on a single T-pin connector 108. Additionally, the T-pin connectors 108 for the upper pressure plate 150 and the lower pressure plate 170 provides the ability to quickly exchange the upper cutting tool 110 and lower cutting tool 130 to a different set configured to cut a different size cast iron pipe.

Figure 5:
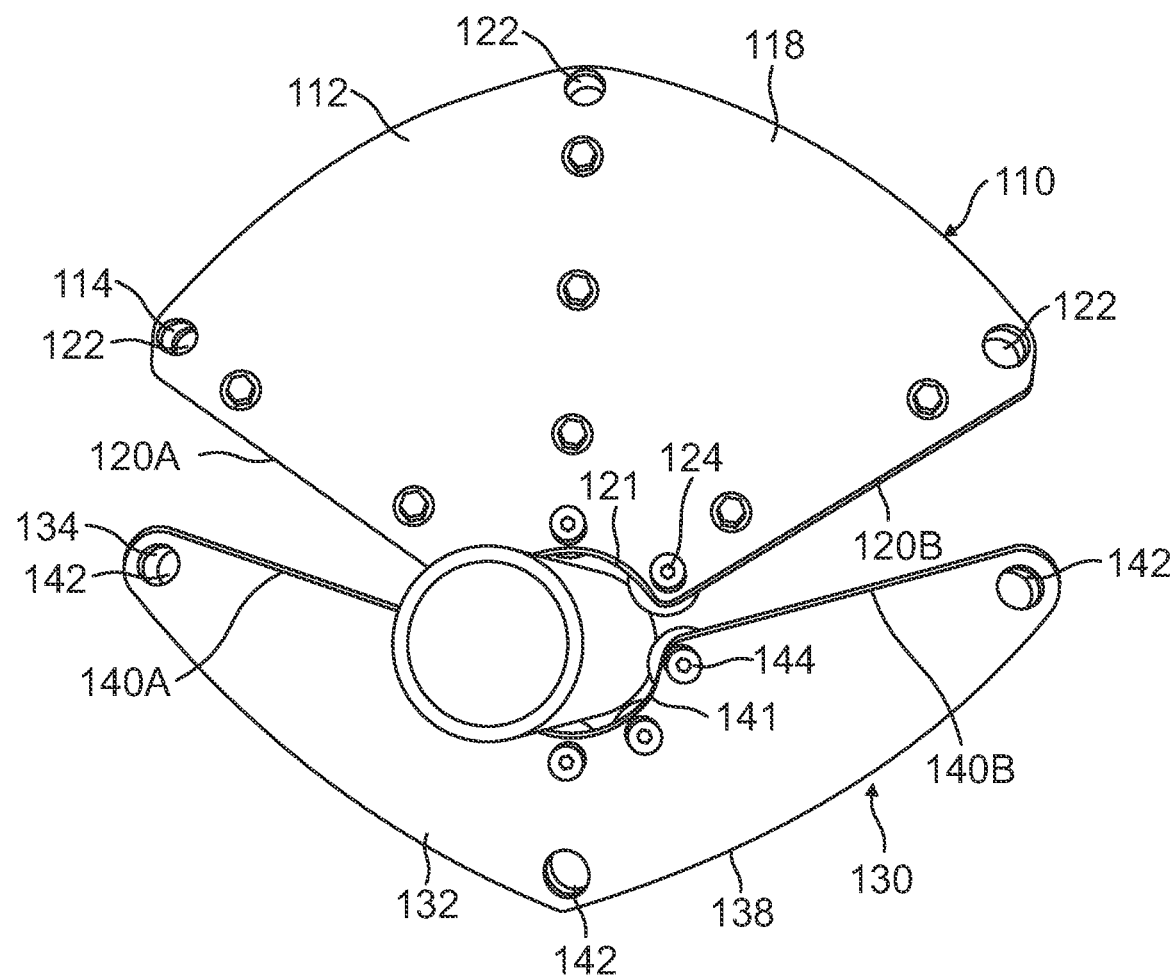
FIG. 5 is a front elevation view of an upper cutting tool and lower cutting tool of the hydraulic cutter.

Referring now to FIG. 5, a front elevation view of the upper cutting tool 110 and lower cutting tool 130 of the hydraulic cutting tool 100 is shown. The upper cutting tool 110 includes a first plate 112 attached to a second plate 114 a distance 116 apart (not shown in the figure), which forms a gap between the first plate 112 and the second plate 114. In a preferred embodiment, a spacer plate 113 (not shown in the figure) is placed between the first plate 112 and the second plate 114 to maintain the distance 116 of the gap. It is contemplated that the spacer plate 113 may be omitted without departing from the spirit and scope of the invention. A series of nuts and bolts rigidly attach the first plate 112, the spacer plate 113, and the second plate 114 together to prevent the upper cutting tool 110 from flexing. The first plate 112 and the second plate 114 are substantially similar; as the plates are substantially similar only the first plate 112 will be described in detail with the description equally applicable to the second plate 114. The first plate 112 is pie-shaped with a first curved edge 118, a left edge 120A, a right edge 120B, and an upper cutting tool cutting disc support 121. Adjacent to the first curved edge 118 are three evenly spaced mounting points 122, with one mounting point 122 located at the mid-point and a mounting point 122 located at each corner. The mounting points 122 are spaced to evenly transfer the force from the upper pressure plate 150 to the plurality of cutting disc mounting points 124. Formed within the upper cutting tool cutting disc support 121 is a plurality of cutting disc mounting points 124. The shape and size of the upper cutting tool cutting disc support 121 and the location of the cutting disc mounting points 124 correspond with the size of the cast iron pipe to be cut.

Similarly to the upper cutting tool 110, the lower cutting tool 130 also includes a first plate 132 attached to a substantially similar second plate 134 a distance 136 apart (shown in FIG. 6), which creates a gap between the first plate 132 and the second plate 134. The distance 136 of the lower cutting tool 130 and the distance 116 of the upper cutting tool 110 are equal. In a preferred embodiment, a spacer plate 133 (not shown in the figure) is placed between the first plate 132 and the second plate 134 to maintain the distance 136 of the gap. It is contemplated that the spacer plate 133 may be omitted without departing from the spirit and scope of the invention. A series of nuts and bolts rigidly attach the first plate 132, the spacer plate 133, and the second plate 134 together to prevent the lower cutting tool 130 from flexing. As the first plate 132 and second plate 134 are substantially similar, only the first plate 132 will be described in detail with the description equally applicable to the second plate 134. The first plate 132 is triangular-shaped with a first curved edge 138, a left edge 140A, a right edge 140B, and a lower cutting tool cutting disc support 141. Adjacent to the first curved edge 138 are three evenly spaced mounting points 142, with one mounting point 142 located at the mid-point and a mounting point 142 located at each corner. Formed in the lower cutting tool cutting disc support 141 is a plurality of cutting disc mounting points 144. The shape and size of the lower cutting tool cutting disc support 141 and the location of the cutting disc mounting points 144 correspond with the size of the cast iron pipe to be cut.

Figure 6:
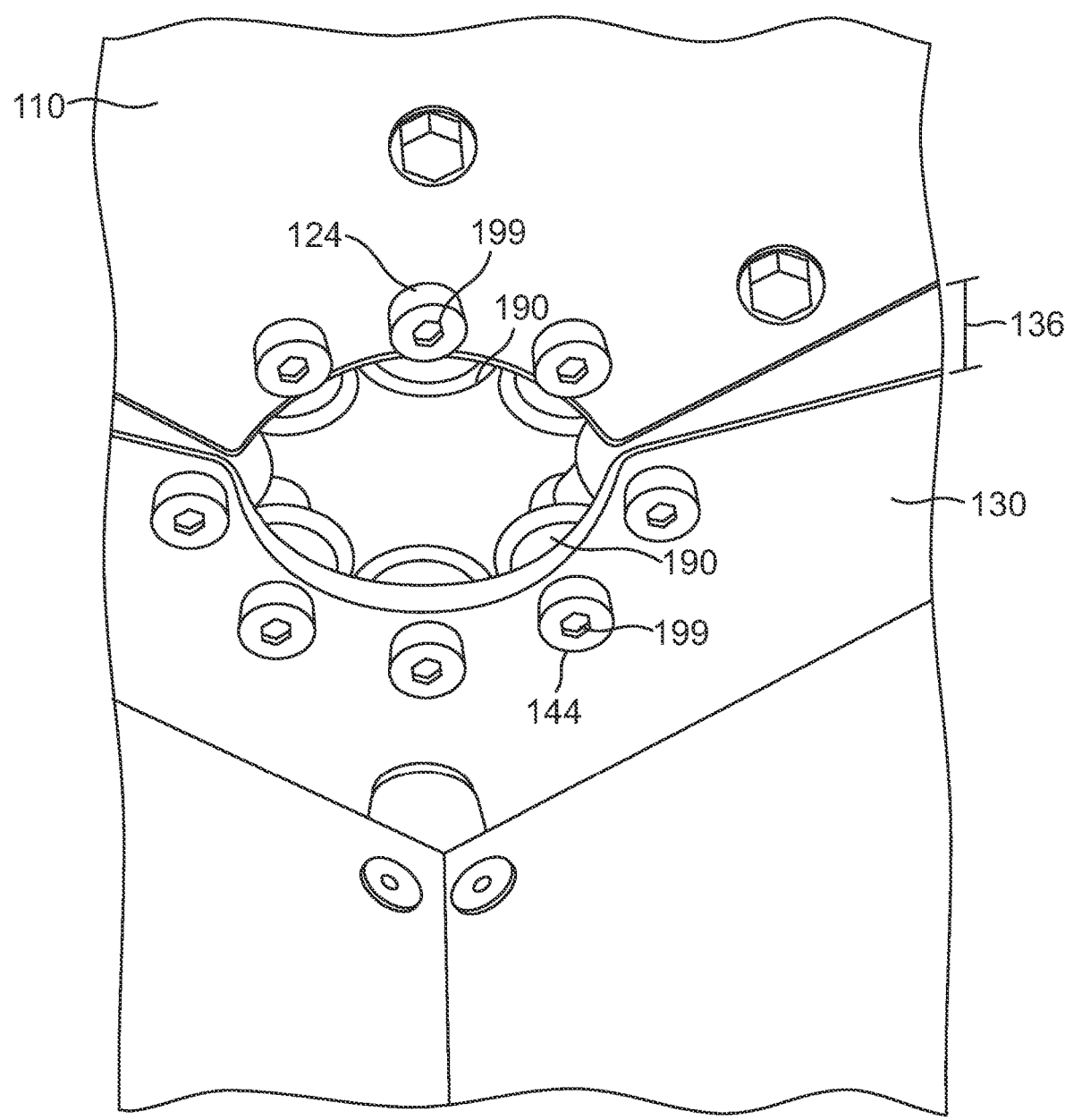
FIG. 6 is a close-up view of the upper cutting tool and lower cutting tool of the hydraulic cutter in an engagement position with a cast iron pipe.

Referring now to FIG. 6, a close-up view of the upper cutting tool 110 and the lower cutting tool 130 in an engagement position with a cast iron pipe is shown. Cutting discs 190 are attached to the cutting disc mounting points 124 of the upper cutting tool 110 and the cutting disc mounting points 144 of the lower cutting tool 130 with cutting disc pins 199. The cutting discs 190 are made of material to withstand the pressures required to cut cast iron pipe without itself cracking or deforming. In the preferred embodiment, the cutting discs 190 has a hardness range between 38-52 in the Hardness Rockwell C scale. Likewise, the cutting disc pins 199 are made of a material capable of withstanding these pressures. The cutting discs 190 do not contact each other and freely rotate about the cutting disc pins 199. By enabling the free rotation of the cutting discs 190 the pressure exerted by the cutting discs 190 is always normal to the exterior surface of the cast iron pipe. It is contemplated that the cutting discs 190 may be locked to ensure the force applied by the cutting discs 190 to the cast iron pipe is applied at a specific point and direction.

Figure 7:
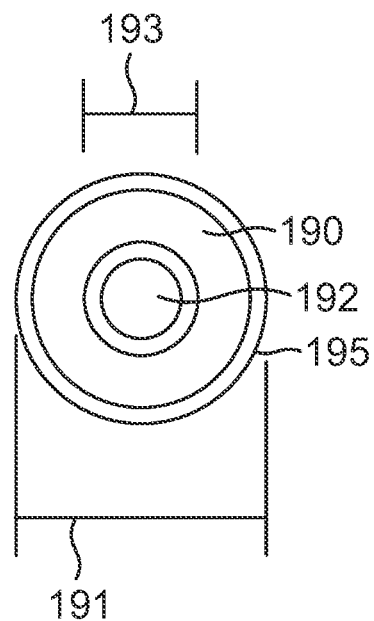
FIG. 7 is a front elevation view of a cutting disc.
Figure 8:
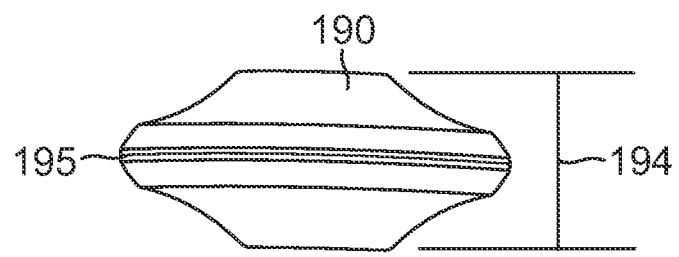
FIG. 8 is a top plan view of the cutting disc.

The cutting disc 190, described in conjunction with FIGS. 7 and 8, is a disc with a diameter 191 having a central bore 192 with a bore diameter 193. The cutting disc 190 has a maximum thickness 194 at the central bore 192 and tapers to a cutting edge 195. The maximum thickness 194 of the cutting disc 190 provides a large bearing surface in the central bore 192. Additionally, the maximum thickness 194 of the cutting disc 190 substantially matches the distance 116 of the upper cutting tool 110 and the distance 136 of the lower cutting tool 130 to provide a slide fit for the cutting disc 190 in the upper cutting tool 110 and the lower cutting tool 130. The bearing surface of the central bore 192 in conjunction with the slide fit of the cutting disc 190 into the upper cutting tool 110 and the lower cutting tool 130 allows the cutting disc 190 to rotate freely about the cutting disc pin 199. Additionally, the cutting disc pin 199 and the plates of the upper cutting tool 110 and the lower cutting tool 130 prevent the cutting discs 190 from cambering. By further torqueing the cutting disc pins 199, the cutting discs 190 may be compressed between the pair of plates of the upper cutting tool 110 and lower cutting tool 130 to prevent rotation of the cutting discs 190.

The upper cutting tool 110 and lower cutting tool 130 are manufactured as a set to specifically cut a specific diameter of cast iron pipe and utilize the same cutting discs 190 per set to ensure the fracture formation is consistent for each cutting discs 190. However, the diameter of the cutting discs 190 can vary per set of upper cutting tool 110 and lower cutting tool 130. Preferably, cutting disc 190 diameters range from 0.750 to 1.250 inches. Preferably, the diameter 191 of the cutting discs 190 vary between 0.750 inches to 1.250 inches per set of the upper cutting tool 110 and the lower cutting tool 130 in accordance to the diameter of cast iron pipe to be cut.

Figure 9:
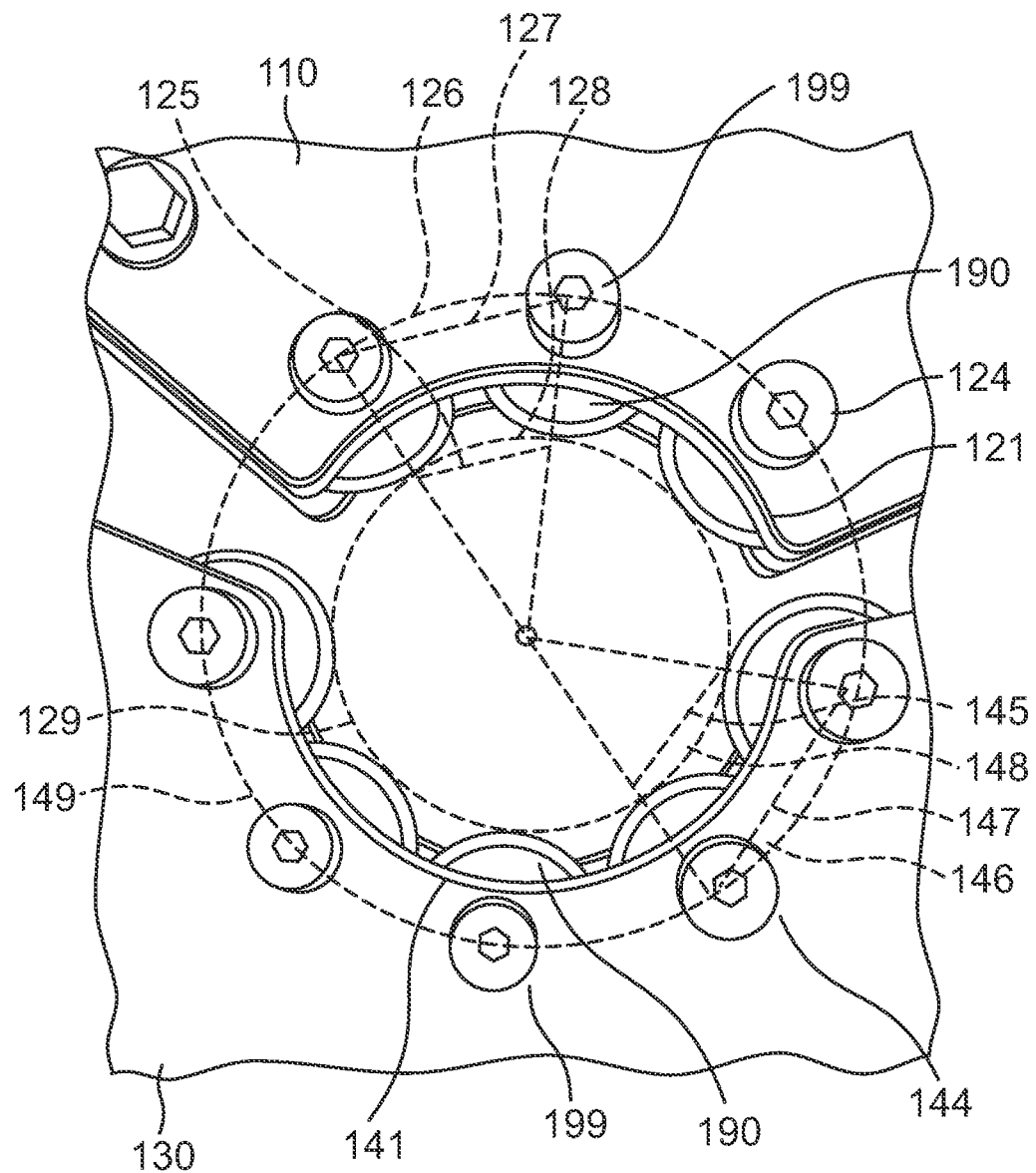
FIG. 9 is a is a close-up view of the upper cutting tool and lower cutting tool of the hydraulic cutter in the engagement position.

Referring now to FIG. 9, a close-up view of an embodiment of the upper cutting tool 110 and the lower cutting tool 130 configured for cutting 2-inch diameter cast iron pipe in the engagement position is shown. Additional configurations for larger diameter pipes is set forth below in conjunction with FIGS. 9A through 9D. Returning to FIG. 9, the upper cutting tool 110 includes three cutting disc mounting points 124 spaced an arc length 126 and an upper mounting point center-to-center distance 127 apart from one another. Due to the spacing of the cutting disc mounting points 124 and the dimensions of the cutting discs 190 configured to specifically cut 2-inch diameter cast iron pipe, the contact point of each cutting disc 190 of the upper cutting tool 110 with the outer surface of the 2-inch diameter cast iron pipe has an arc length 128 and an upper contact point center-to-center distance 125 from one another. The lower cutting tool 130 includes five cutting disc mounting points 144 spaced an arc length 146 and a lower mounting point center-to-center distance 147 apart from one another. Due to the spacing of the cutting disc mounting points 144 and the dimensions of the cutting discs 190 configured to specifically cut 2-inch diameter cast iron pipe, the contact point of each cutting disc 190 of the lower cutting tool 130 with the outer surface of the 2-inch diameter cast iron pipe has an arc length 148 and a lower contact point center-to-center distance 145 from one another. In a preferred embodiment for the hydraulic cutting tool 100 configured to cut 2-inch diameter cast iron pipe, the upper mounting point center-to-center distance 127 is 1.3346 inches, the lower mounting point center-to-center distance 147 is 1.2383 inches, the upper contact point center-to-center distance 125 is 0.8082 inches, and the lower contact point center-to-center distance 145 is 0.8082 inches.

At the point of engagement with the 2-inch diameter cast iron pipe, the contact points of the cutting discs 190 of the upper cutting tool 110 and the lower cutting tool 130 inscribe a contact point circle 129 with a diameter smaller than the outer diameter of the 2-inch cast iron pipe; the cutting disc mounting points 124 and 144 inscribe a mounting point circle 149. In the preferred embodiment, the contact point circle 129 is $30/1000^{th}$ smaller than the diameter of the 2-inch cast iron pipe to be cut. The contact points of the cutting discs 190 inscribing the contact point circle 129 ensure that the cutting discs 190 of the upper cutting tool 110 and the lower cutting tool 130 contact the cast iron pipe sequentially. The outermost cutting discs 190 of the upper cutting tool 110 and the lower cutting tool 130 contacts the curved outer surface of the 2-inch diameter cast iron pipe first to create initial fractures. As the initial fractures begin to form from the pressures applied by the outermost cutting discs 190, the adjacent cutting discs 190 located inwards from the outermost cutting discs 190 then begins to apply pressure to the curved outer surface of the 2-inch diameter cast iron pipe until each of the adjacent cutting discs 190 begin to form a fracture in the 2-inch diameter cast iron pipe. Almost simultaneously as the fracture begins to form from the adjacent cutting discs 190, the fractures from the outermost cutting discs 190 are fully formed and grow until it amalgamates with the growing fracture of the adjacent cutting discs 190. The formation, growth, and amalgamation of the fractures proceed in a sequential order starting from the outermost cutting discs 190 and meets at the innermost cutting discs 190 of the upper cutting tool 110 and lower cutting tool 130. The multiple fractures amalgamate into a single fracture and the 2-inch cast iron pipe is cut almost instantaneously.

The upper cutting tool 110 and lower cutting tool 130 are manufactured in sets to specifically cut a specific diameter cast iron pipe, e.g., 2-inch diameter cast iron pipe, and are made to be easily and quickly swapped into and out of the hydraulic cutting tool 100. Each set of the upper cutting tool 110 and the lower cutting tool 130 are substantially similar with the differences being the number of cutting discs 190, the diameter 191 of the cutting discs 190, the shape and size of the upper cutting tool cutting disc support 121 and the lower cutting tool cutting disc support 141, the arc length 126 and 146 between each cutting disc 190, and the center-to center distance 127 and 147 between each cutting disc 190. Accordingly, the contact point circle 129 and the mounting point circle 149, the upper contact point center-to-center distance 125, and the lower contact point center-to-center distance 145 changes. The contact points of the cutting discs 190 may be between 0.700 inch and 1.250 inches depending on the diameter of the cast iron pipe to be cut, but the contact point circle 129 is always smaller than the diameter of the cast iron pipe to be cut, preferably at least $10/1000^{th}$ of an inch smaller and no more than $50/1000^{th}$ of an inch smaller. A contact point circle 129 approximately $30/1000^{th}$ an inch smaller than the diameter of the cast iron pipe to be cut is optimal.

As with all embodiments disclosed herein, each diameter of cast iron pipe requires a specific upper contact point center-to-center distance 125 and arc length 128 between each cutting discs 190 of the upper cutting tool 110 and a specific lower contact point center-to-center distance 145 and arc length 148 between each cutting discs 190 of the lower cutting tool 130 for the proper formation, growth, and amalgamation of fractures. By configuring the diameter 191 of the cutting discs and the quantity of cutting discs 190, the proper upper contact point center-to-center distance 125, arc length 128, lower contact point center-to-center distance 145, and arc length 148 may be achieved. Likewise, the upper cutting tool cutting disc support 121, the cutting disc mounting points 124, the arc length 126, upper mounting point center-to-center distance 127, the lower cutting tool cutting disc support 141, the cutting disc mounting points 144, the arc length 146, and the lower mounting point center-to-center distance 147 are configured to position and support the required quantity of cutting discs 190 with diameter 191 to achieve the proper upper contact point center-to-center distance 125, arc length 128, lower contact point center-to-center distance 145, and arc length 148. Accordingly, the contact point circle 129 and the mounting point circle 149 vary between each set of upper cutting tool 110 and lower cutting tool 130.

The mounting points 122 and 142 are standardized to be the same between each set of upper cutting tool 110 and lower cutting tool 130. By standardizing the mounting points 122 and 142, the mounting points 122 and 142 are the same for each set of upper cutting tools 110 and lower cutting tools 130. Each set of upper cutting tools 110 and lower cutting tools 130 are configured to quickly swap in to and out of the hydraulic cutting tool 100.

Figure 9A:
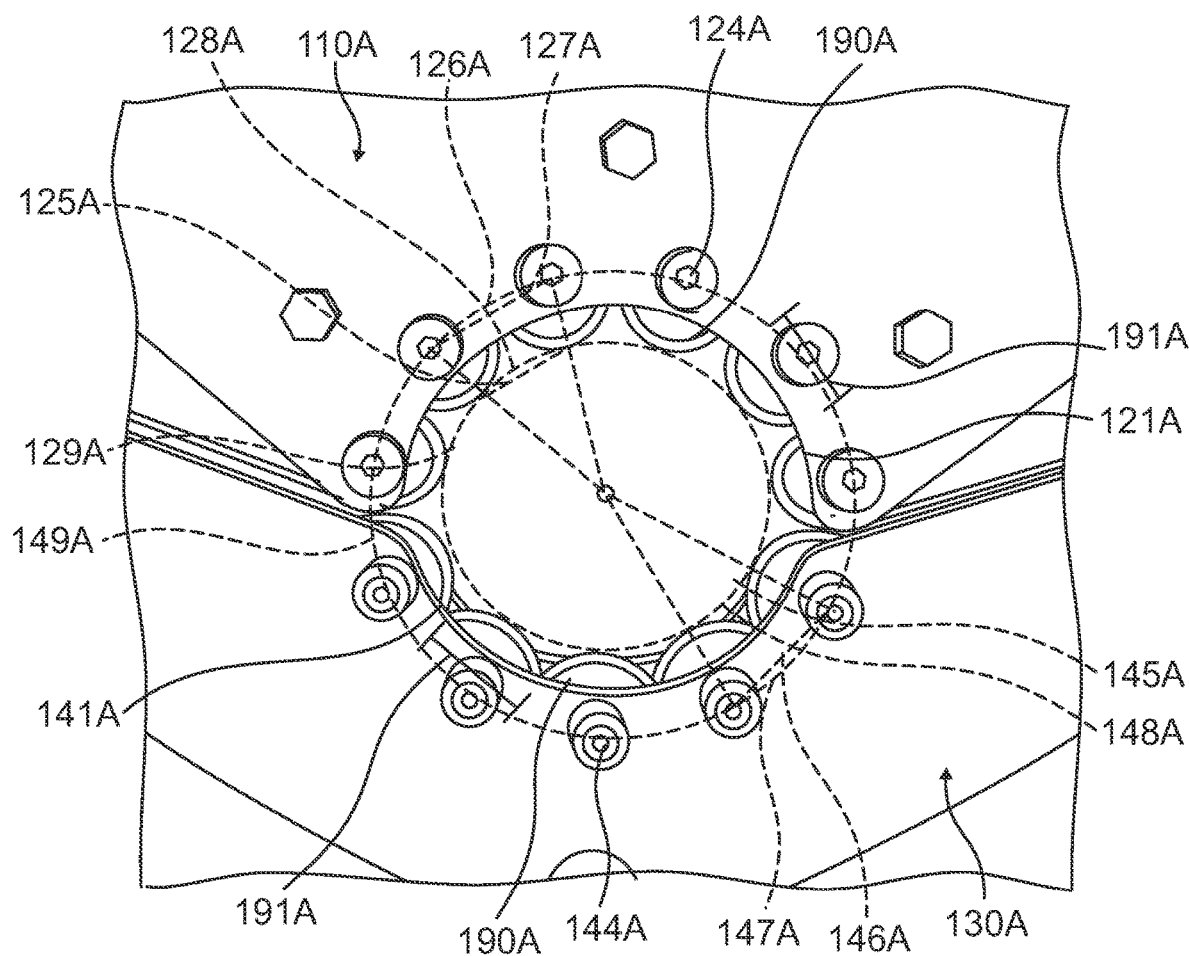
FIG. 9A is a close-up view of an alternative embodiment of the upper cutting tool and the lower cutting tool configured to cut 3-inch diameter cast iron pipe.

Referring now to FIG. 9A, a close-up view of an alternative embodiment of an upper cutting tool 110A and a lower cutting tool 130A configured to cut 3-inch diameter cast iron pipe is shown. As discussed herein, the upper cutting tool 110A and the lower cutting tool 130A are substantially similar to the upper cutting tool 110 and lower cutting tool 130, respectively, and wherein like reference numbers reference like parts. The upper cutting tool 110A includes a modified upper cutting tool cutting disc support 121A and includes six cutting disc mounting points 124A spaced an arc length 126A and a center-to-center distance 127A apart from one another. The contact point of each cutting disc 190A of the upper cutting tool 110A has an arc length 128A and an upper contact point center-to-center distance 125A from one another. The lower cutting tool 130A includes a modified lower cutting tool cutting disc support 141A and includes five cutting disc mounting points 144A spaced an arc length 146A and a center-to-center distance 147A apart from one another. The contact point of each cutting disc 190A of the lower cutting tool 130A has an arc length 148A and a lower contact point center-to-center distance 145A from one another.

Accordingly, the contact point circle 129A and the mounting point circle 149A is modified to meet the requirements of a 3-inch diameter cast iron pipe, with the contact point circle 129A smaller than the diameter of the 3-inch diameter cast iron pipe, preferably by $30/1000^{th}$ of an inch. In this embodiment, shown in FIG. 9A, cutting discs 190A have a 1.228 inch diameter, the upper mounting point center-to-center distance 127A is 1.2666 inches, the lower mounting point center-to-center distance 147A is 1.2574 inches, the upper contact point center-to-center distance 125A is 0.9206 inches, and the lower contact point center-to-center distance 145A is 0.9206 inches.

Figure 9B:
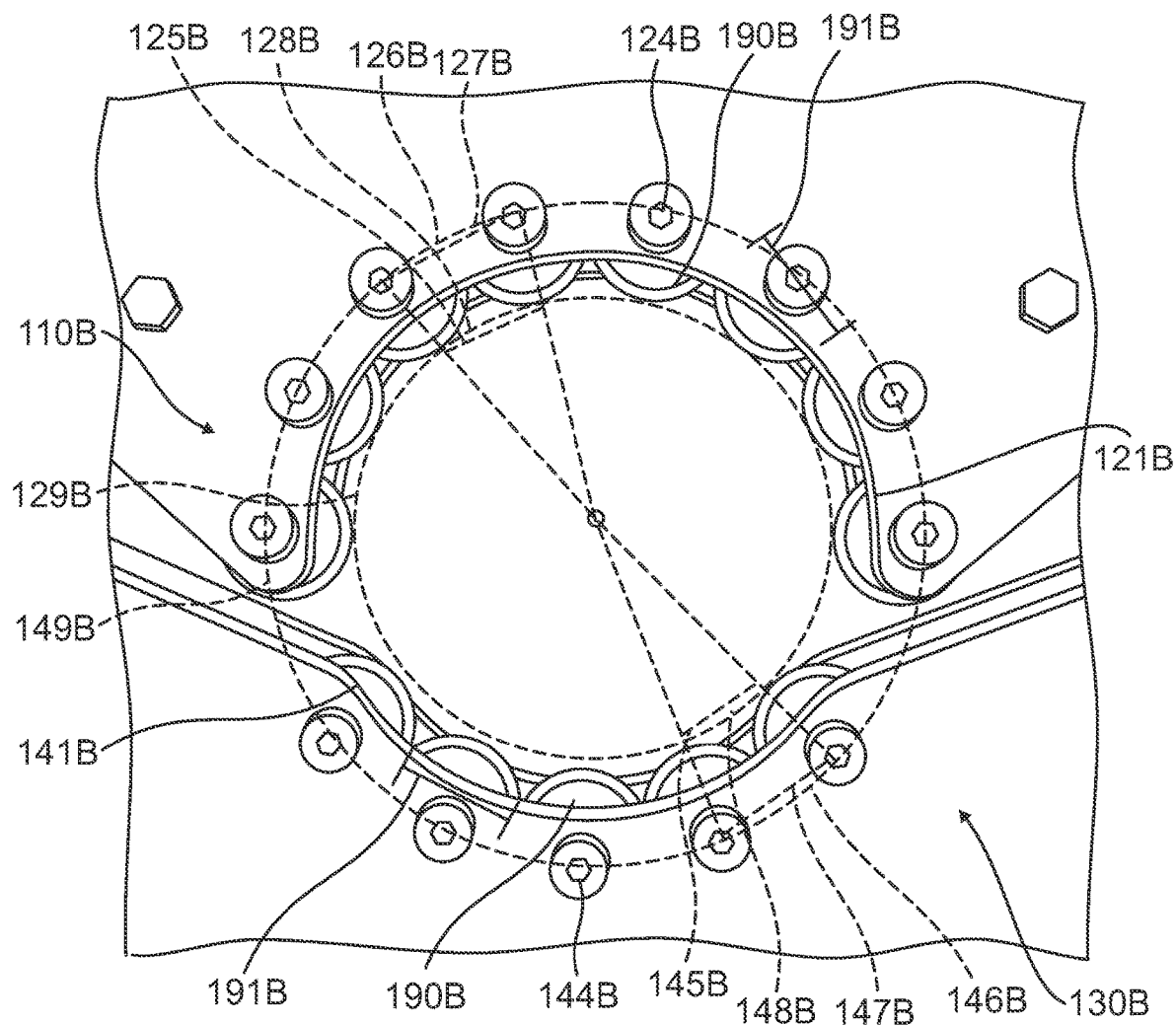
FIG. 9B is a close-up view an alternative embodiment of the upper cutting tool and the lower cutting tool configured to cut 4-inch diameter cast iron pipe.

Referring now to FIG. 9B, a close-up view of an alternative embodiment of an upper cutting tool 110B and a lower cutting tool 130B configured to cut 4-inch diameter cast iron pipe is shown. As discussed herein, the upper cutting tool 110B and the lower cutting tool 130B are substantially similar to the upper cutting tool 110 and lower cutting tool 130, respectively, and wherein like reference numbers reference like parts. The upper cutting tool 110B includes a modified upper cutting tool cutting disc support 121B and includes eight cutting disc mounting points 124B spaced an arc length 126B and a center-to-center distance 127B apart from one another. The contact point of each cutting disc 190B of the upper cutting tool 110B has an arc length 128B and an upper contact point center-to-center distance 125B from one another. The lower cutting tool 130B includes a modified lower cutting tool cutting disc support 141B and includes five cutting disc mounting points 144B spaced an arc length 146B and a center-to-center distance 147B apart from one another. The contact point of each cutting disc 190B of the lower cutting tool 130B has an arc length 148B and a lower contact point center-to-center distance 145B from one another.

Accordingly, the contact point circle 129B and the mounting point circle 149B is modified to meet the requirements of a 4-inch diameter cast iron pipe, with the contact point circle 129B smaller than the diameter of the 4-inch diameter cast iron pipe by $30/1000^{th}$. In this embodiment, shown in FIG. 9B, cutting discs 190B have a 1.228 inch diameter, the upper mounting point center-to-center distance 127B is 1.2318 inches, the lower mounting point center-to-center distance 147A is 1.2457 inches, the upper contact point center-to-center distance 125B is 0.9575 inches, and the lower contact point center-to-center distance 145B is 0.9575 inches.

Figure 9C:
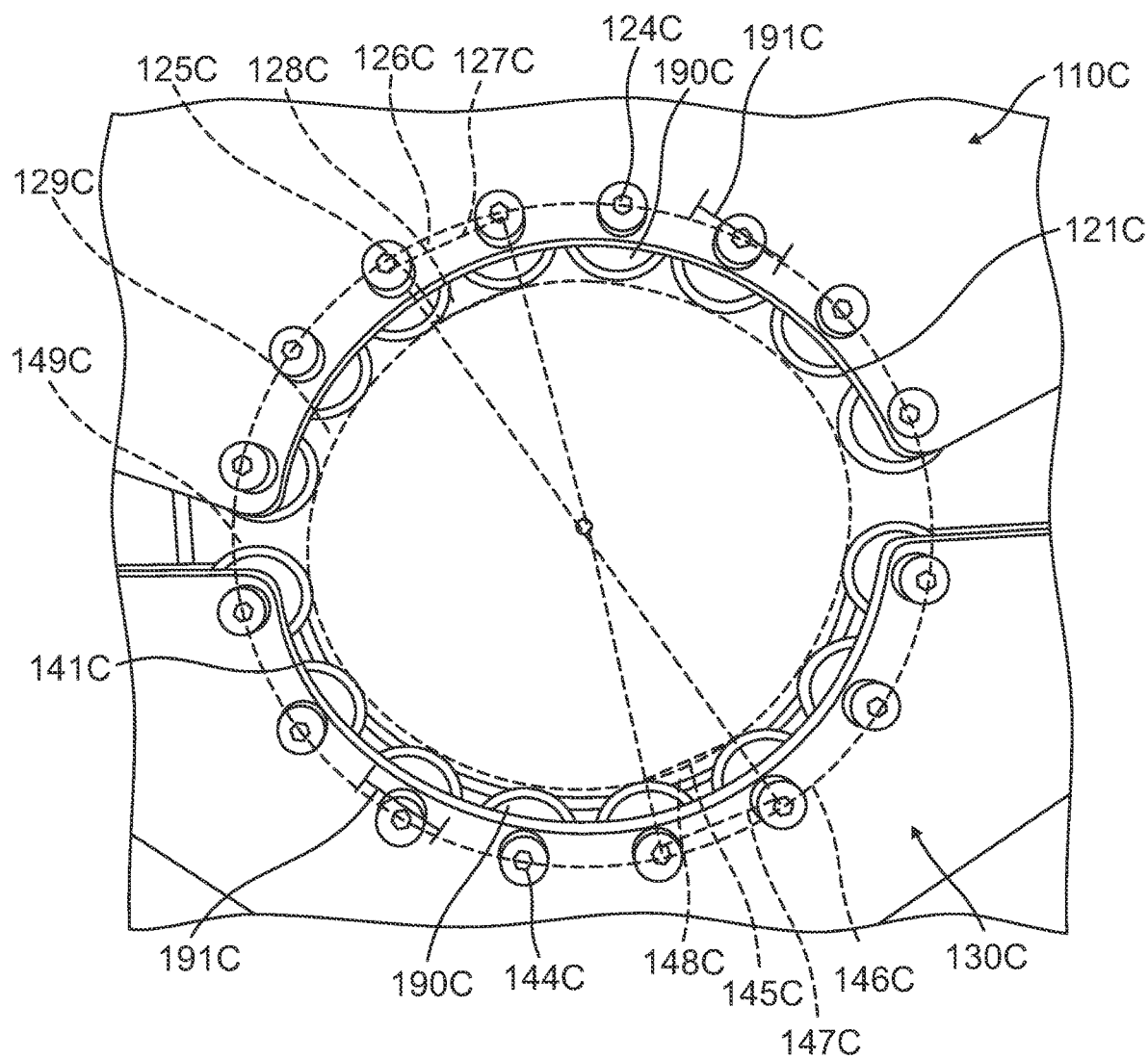
FIG. 9C is a close-up view of an alternative embodiment of the upper cutting tool and the lower cutting tool configured to cut 6-inch diameter cast iron pipe.

Referring now to FIG. 9C, a close-up view of an alternative embodiment of an upper cutting tool 110C and a lower cutting tool 130C configured to cut 6-inch diameter cast iron pipe is shown. As discussed herein, the upper cutting tool 110C and the lower cutting tool 130C are substantially similar to the upper cutting tool 110 and lower cutting tool 130, respectively, and wherein like reference numbers reference like parts. The upper cutting tool 110C includes a modified upper cutting tool cutting disc support 121C and includes eight cutting disc mounting points 124C spaced an arc length 126C and a center-to-center distance 127C apart from one another. The contact point of each cutting disc 190C of the upper cutting tool 110C has an arc length 128C and an upper contact point center-to-center distance 125C from one another. The lower cutting tool 130C includes a modified lower cutting tool cutting disc support 141C and includes eight cutting disc mounting points 144C spaced an arc length 146C and a center-to-center distance 147C apart from one another. The contact point of each cutting disc 190C of the lower cutting tool 130C has an arc length 148C and a lower contact point center-to-center distance 145C from one another.

Accordingly, the contact point circle 129C and the mounting point circle 149C is modified to meet the requirements of a 6-inch diameter cast iron pipe, with the contact point circle 129C smaller than the diameter of the 6-inch diameter cast iron pipe by $30/1000^{th}$. In this embodiment, shown in FIG. 9C, cutting discs 190C have a 1.228 inch diameter, the upper mounting point center-to-center distance 127C is 1.2955 inches, the lower mounting point center-to-center distance 147C is 1.4633 inches, the upper contact point center-to-center distance 125C is 1.0895 inches. The lower contact point center-to-center distance 145C is 1.0895 inches.

Figure 9D:
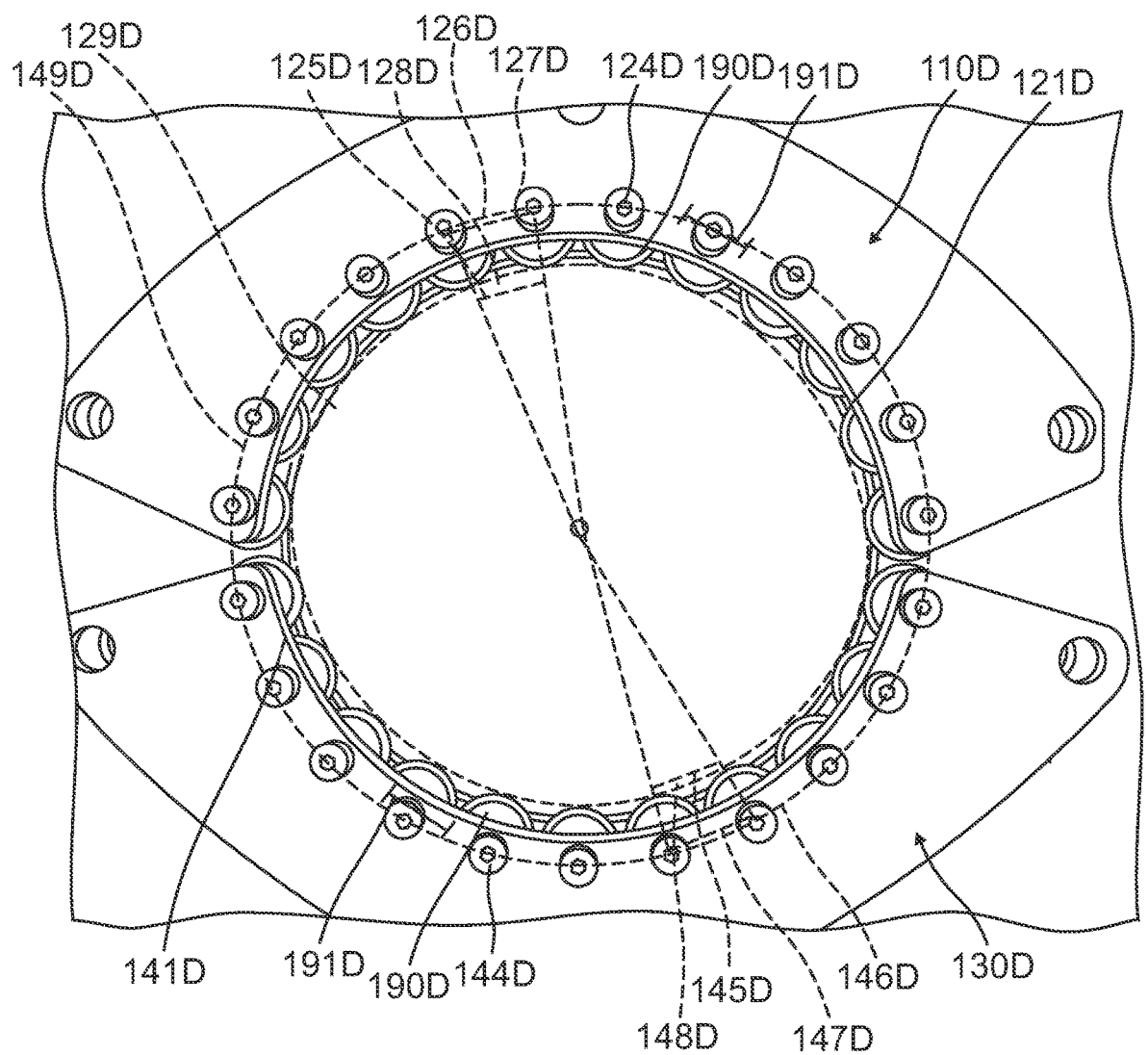
FIG. 9D is a close-up view of an alternative embodiment of the upper cutting tool and the lower cutting tool configured to cut 8-inch diameter cast iron pipe.

Referring now to FIG. 9D, a close-up view of an alternative embodiment of an upper cutting tool 110D and a lower cutting tool 130D configured to cut 8-inch diameter cast iron pipe is shown. As discussed herein, the upper cutting tool 110D and the lower cutting tool 130D are substantially similar to the upper cutting tool 110 and lower cutting tool 130, respectively, and wherein like reference numbers reference like parts. The upper cutting tool 110D includes a modified upper cutting tool cutting disc support 121D and includes 12 cutting disc mounting points 124D spaced an arc length 126D and a center-to-center distance 127D apart from one another. The contact point of each cutting disc 190D of the upper cutting tool 110D has an arc length 128D and an upper contact point center-to-center distance 125D from one another. The lower cutting tool 130D includes a modified lower cutting tool cutting disc support 141D and includes 11 cutting disc mounting points 144D spaced an arc length 146D and a center-to-center distance 147D apart from one another. The contact point of each cutting disc 190D of the lower cutting tool 130D has an arc length 148D and a lower contact point center-to-center distance 145D from one another.

Accordingly, the contact point circle 129D and the mounting point circle 149D is modified to meet the requirements of a 8-inch diameter cast iron pipe, with the contact point circle 129D smaller than the diameter of the 8-inch diameter cast iron pipe by $30/1000^{th}$. In this embodiment, shown in FIG. 9D, cutting discs 190D have a 1.228 inch diameter, the upper mounting point center-to-center distance 127D is 1.2446 inches. The lower mounting point center-to-center distance 147D is 1.2446 inches. The upper contact point center-to-center distance 125D is 1.0844 inches. The lower contact point center-to-center distance 145D is 1.0844 inches.

Figure 10:
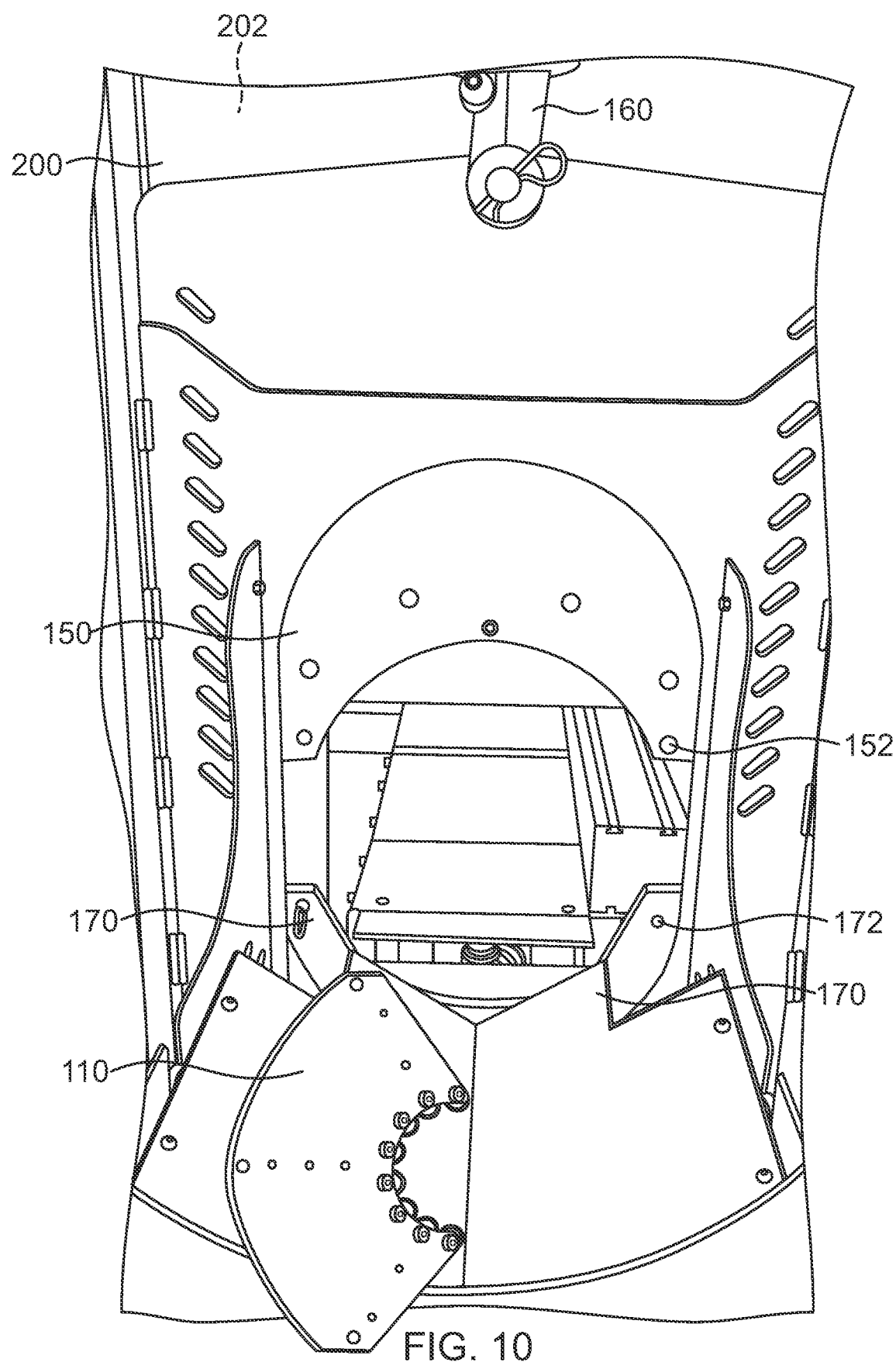
FIG. 10 is a front elevation view of the hydraulic cutter inside of the cabinet without the upper cutting tool and lower cutting tool installed.

Referring now to FIG. 10, a front elevation view of the hydraulic cutting tool 100 inside of the cabinet 200 without the upper cutting tool 110 and lower cutting tool 130 is shown. The hydraulic cutting tool 100 is capable of quickly and easily swapping between different sets of upper cutting tools 110 and lower cutting tools 130 to cut different size cast iron pipes, such as upper cutting tool 110A and lower cutting tool 130A, upper cutting tool 1106 and lower cutting tool 130B, upper cutting tool 110C and lower cutting tool 130C, and upper cutting tool 110D and lower cutting tool 130D. The hydraulic press 160 is withdrawn to create maximum distance between the upper pressure plate 150 and the lower pressure plate 170 for installation of the upper cutting tool 110 and lower cutting tool 130. The upper pressure plate 150 includes multiple mounting points 152, which are standardized and match the mounting points 122 of the upper cutting tool 110. The lower pressure plate 170 includes multiple mounting points 172, which are also standardized and match the mounting points 142 of the lower cutting tool 130.

Figure 11:
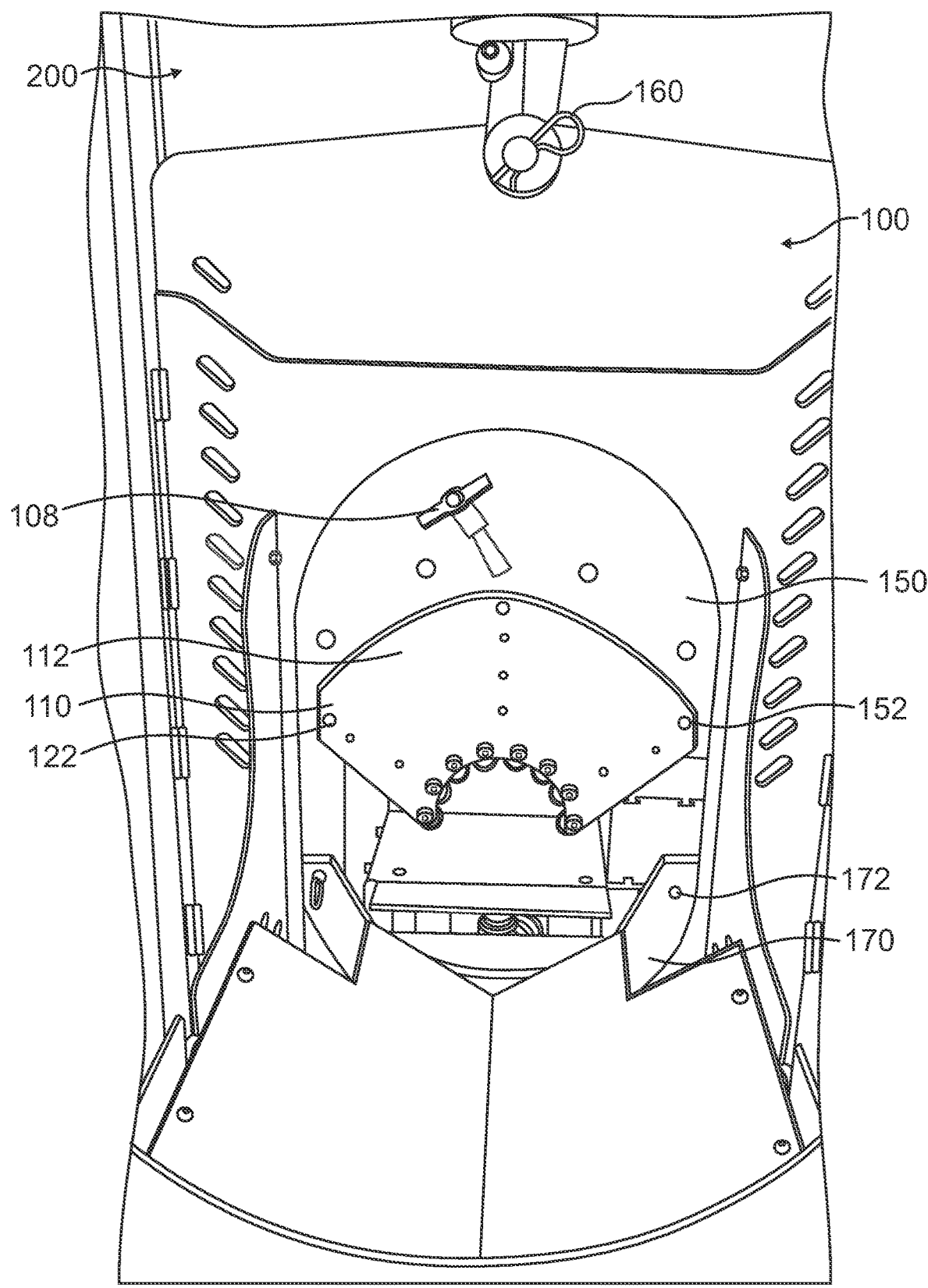
FIG. 11 is a front elevation view of the hydraulic cutter inside of the cabinet with the upper cutting tool in position to be secured to the hydraulic cutter.
Figure 12:
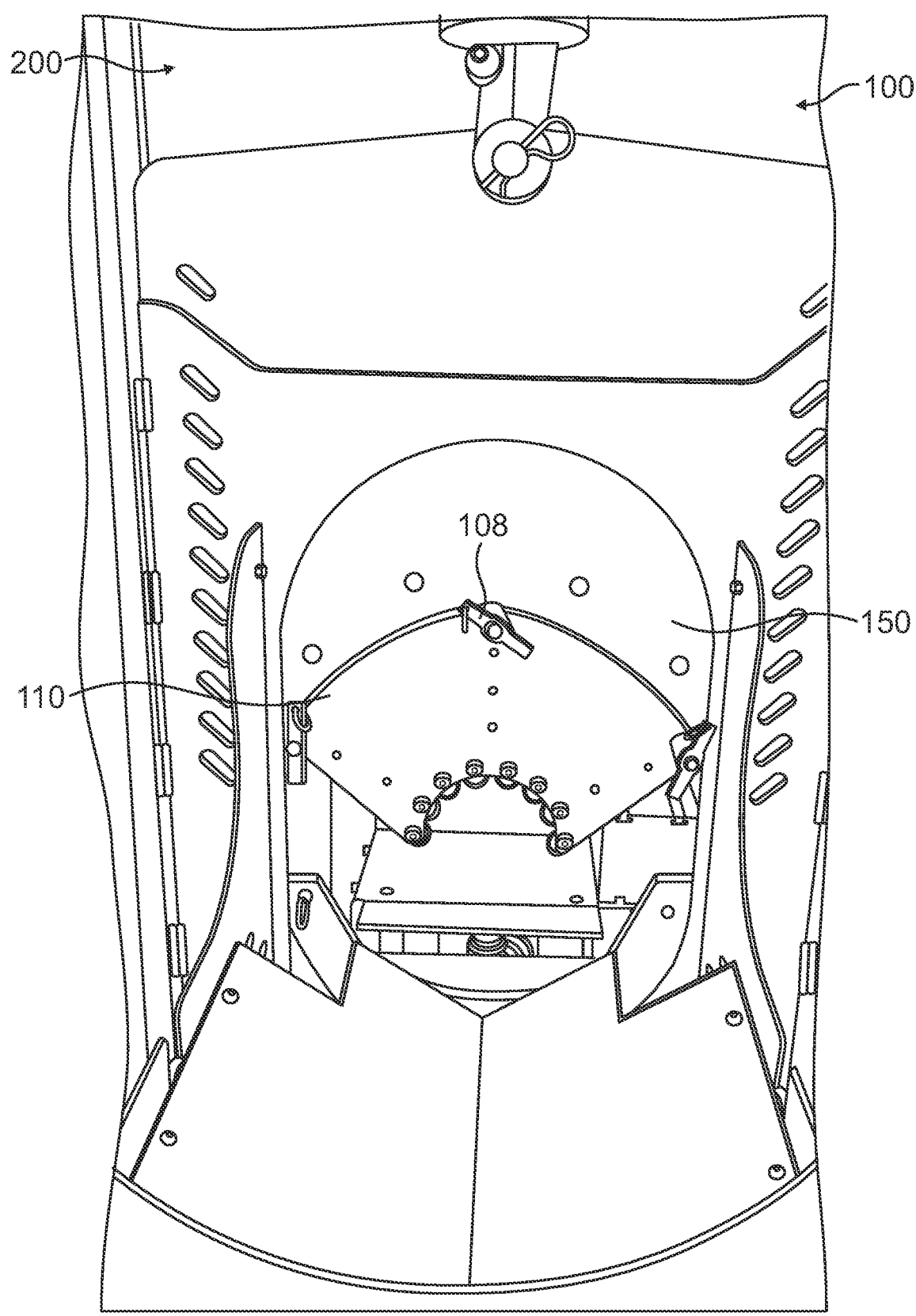
FIG. 12 is a front elevation view of the hydraulic cutter inside of the cabinet with the upper cutting tool installed.

Referring now to FIG. 11, a front elevation view of the hydraulic cutter 100 inside of the cabinet 200 with the upper cutting tool 110 in position to be secured to the upper pressure plate 150 is shown. The upper cutting tool 130 is positioned to slip the first plate 112 and the second plate 114 over the upper pressure plate 150. The mounting points 122 of the upper cutting tool 130 is aligned with the mounting points 152 of the upper pressure plate 150. By aligning the mounting points 122 and 152, the T-handle pins 108 may then be inserted through the mounting points 122 and 152 to secure the upper cutting tool 110 to the upper pressure plate 150, as shown in FIG. 12.

Figure 13:
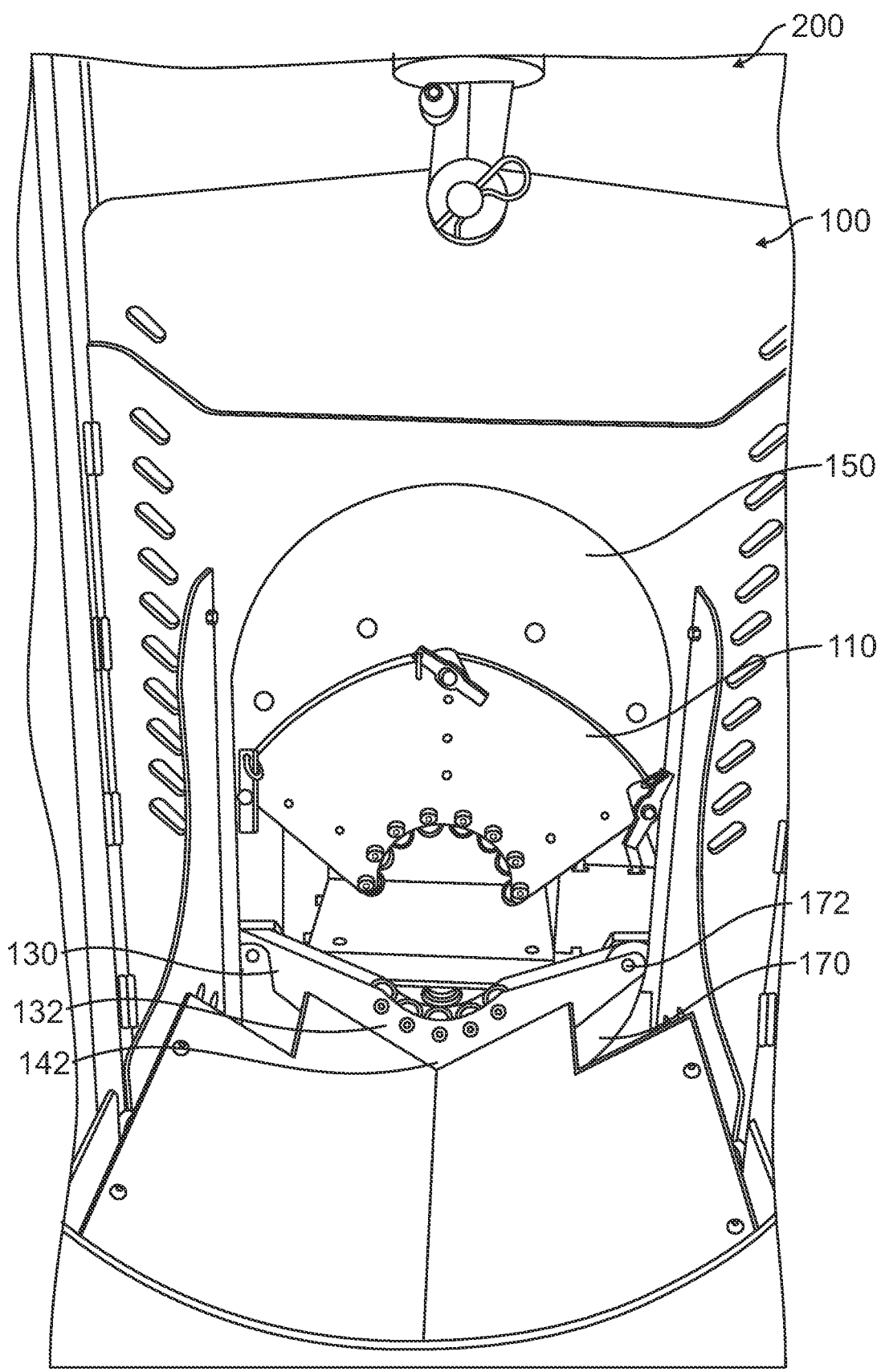
FIG. 13 is a front elevation view of the hydraulic cutter inside of the cabinet with the lower cutting tool in position to be secured to the hydraulic cutter.
Figure 14:
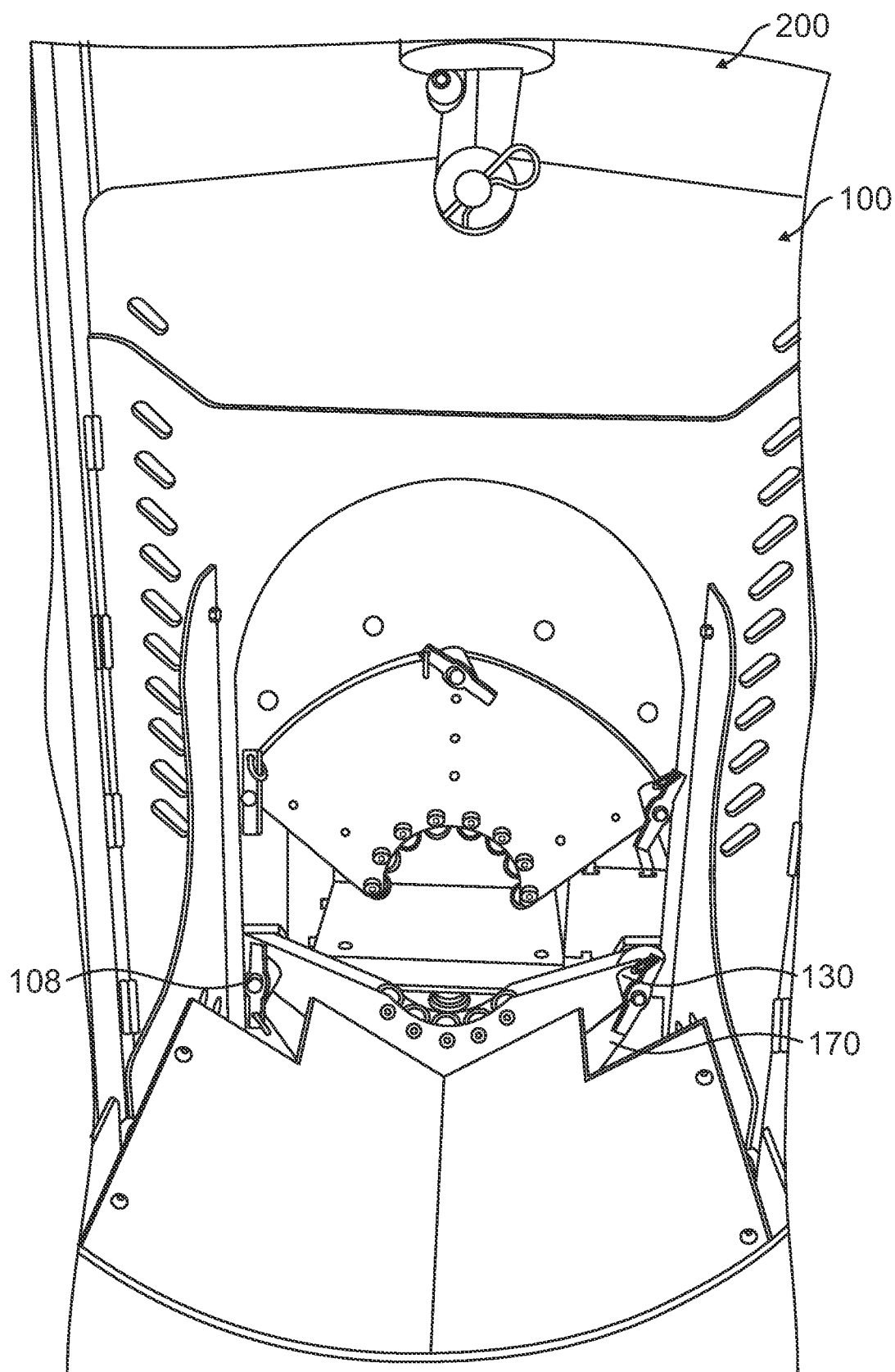
FIG. 14 is a front elevation view of the hydraulic cutter inside of the cabinet with the lower cutting tool installed.

Referring now to FIG. 13, a front elevation view of the hydraulic cutter 100 inside of the cabinet 200 with the upper cutting tool 110 secured to the upper pressure plate 150 and the lower cutting tool 130 positioned into the lower pressure plate 170 is shown. The lower cutting tool 130 is positioned to slip the first plate 132 and the second plate 134 over the lower pressure plate 170. The mounting points 142 of the lower cutting tool 130 is aligned with the mounting points 172 of the lower pressure plate 170. By aligning the mounting points 132 and 172, the T-handle pins 108 may then be inserted through the mounting points 132 and 172 to secure the lower cutting tool 130 to the lower pressure plate 170, as shown in FIG. 14.

Figure 15:
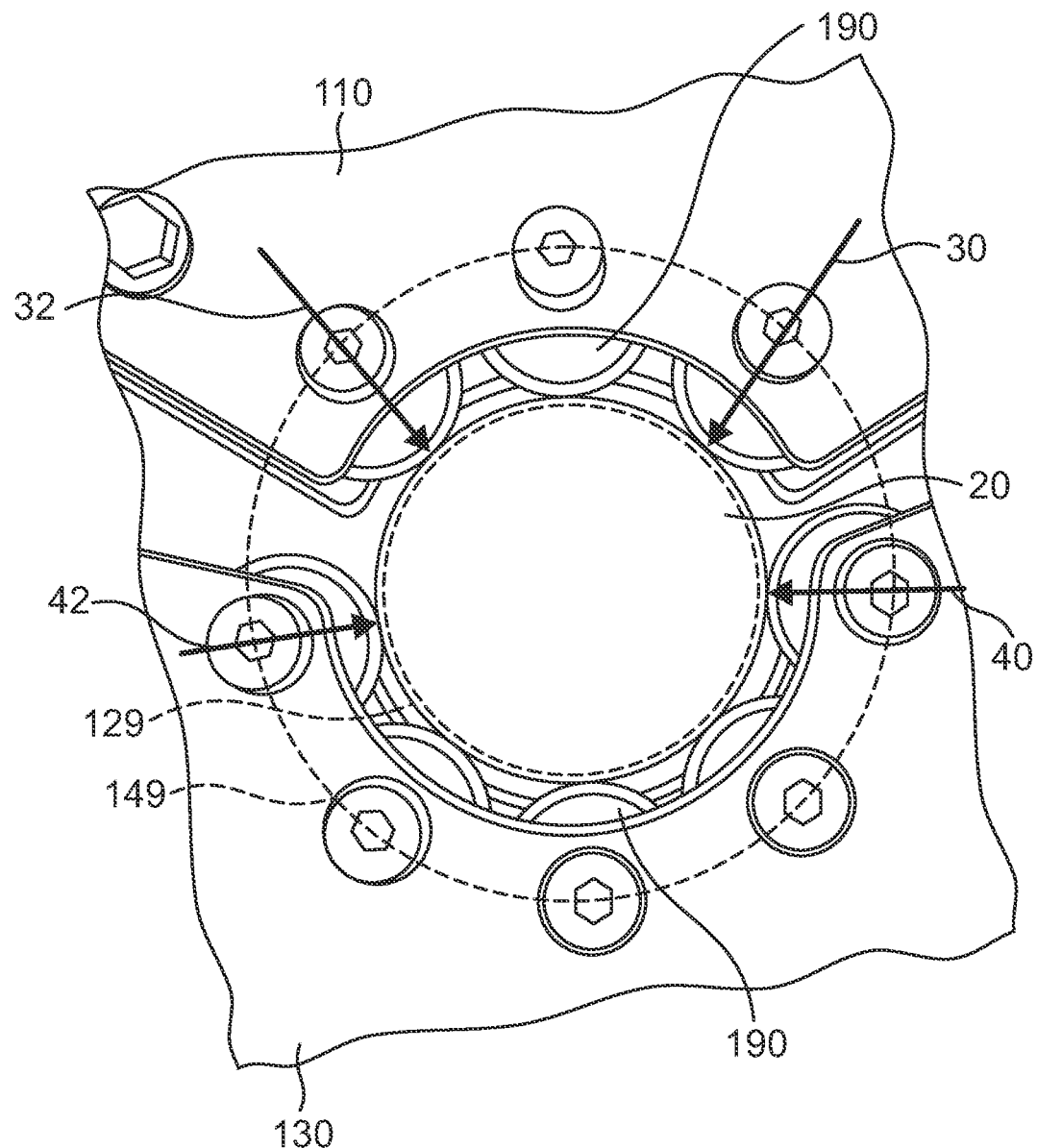
FIG. 15 is a close-up view of the upper cutting tool and lower cutting tool engaging with a cast iron pipe to be cut.

Referring now to FIG. 15, a close-up view of the upper cutting tool 110 and the lower cutting tool 130 of the hydraulic cutting tool 100 engaged with a cast iron pipe 20 to be cut is shown. The cast iron pipe 20 is a 2-inch diameter cast iron pipe and the upper cutting tool 110 and lower cutting tool 130 are configured to cut the 2-inch diameter cast iron pipe 20. The contact points of the cutting discs 190 inscribing the contact point circle 129 ensure that the cutting discs 190 of the upper cutting tool 110 and the lower cutting tool 130 contact the cast iron pipe sequentially. Since the contact point circle 129 is smaller than the diameter of the 2-inch diameter cast iron pipe 20, the larger diameter of the 2-inch diameter cast iron pipe 20 does not fit within the cutting discs 190 of the upper cutting tool 110 and the cutting discs 190 of the lower cutting tool 130. As the upper cutting tool 130 is advanced vertically downward, the cutting discs 190 of the upper cutting tool 110 and lower cutting tool 130 contacts and applies pressure to the 2-inch cast iron pipe 20 in a sequential order starting from the outermost cutting discs 190 inwards towards the innermost cutting discs 190.

The advancement of the upper cutting tool 110 vertically downward towards the lower cutting tool 130 applies pressures 30, 32, 40, and 42 at the contact point between each of the outermost cutting disc 190 and the exterior surface of the 2-inch diameter cast iron pipe 20 simultaneously. The placement of the cutting discs 190 ensures that the pressures 30, 32, 40, and 42 are applied normal to the surface of the two-inch diameter cast iron pipe at the point of contact. Due to the diameter of the 2-inch diameter cast iron pipe 20 being larger than the diameter of the contact point circle 129, the outermost cutting discs 190 of the upper cutting tool 110 and lower cutting tool 130 momentarily prevent the advancement of the upper cutting tool 110 downward.

Figure 16:
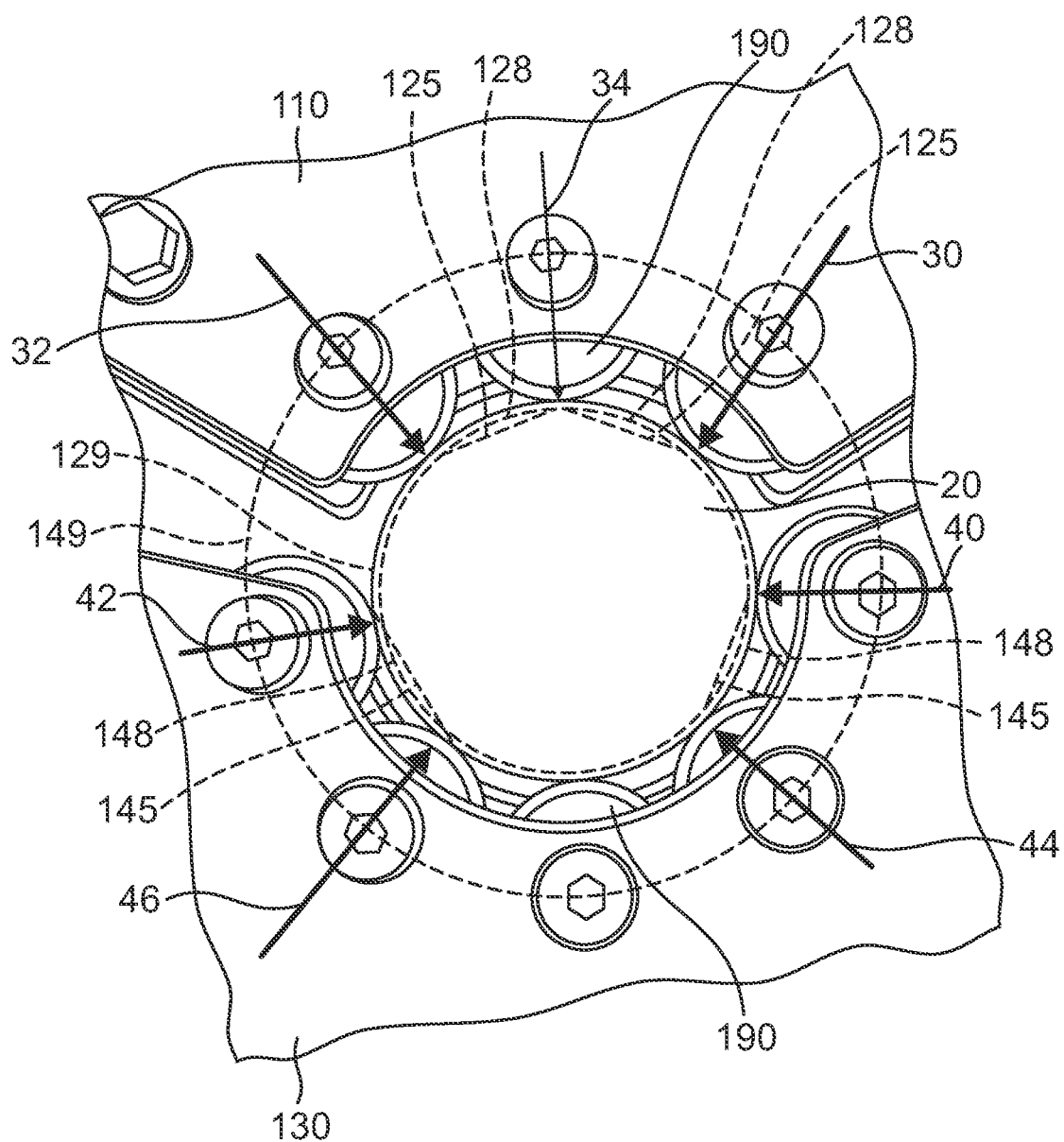
FIG. 16 is a close-up view of the upper cutting tool advanced vertically downward towards the lower cutting tool after initial contact with the cast iron pipe.

Referring now to FIG. 16, a close-up view of the upper cutting tool 110 advanced vertically downward towards the lower cutting tool 130 after initial contact with the 2-inch diameter cast iron pipe 20 is shown. Due to the larger diameter of the 2-inch diameter cast iron pipe 20, the outermost cutting discs 190 of the upper cutting tool 110 and lower cutting tool 130 momentarily prevents the advancement of the upper cutting tool 110 downward until additional pressure is applied. As the upper cutting tool 110 continues to advance vertically downward towards the lower cutting tool 130 and increasing pressure is applied, the cutting discs 190 applying pressures 30, 32, 40, and 42 indents the outer surface of the 2-inch cast iron pipe 20. Simultaneously, the adjacent cutting discs 190 inwards of the outermost cutting discs 190 are able to contact the outer surface of the 2-inch cast iron pipe 20 due to the previously made indents. The upper cutting tool 110 applies pressure 34 at the arc length 128 and upper contact point center-to-center distance 125 inward from pressures 30 and 34. The lower cutting tool 130 applies pressure 44 at the arc length 148 and lower contact point center-to-center distance 145 inward from pressure 42 and applies pressure 46 at the arc length 148 and lower contact point center-to-center distance 145 inward from pressure 40.

The continued advancement of the upper cutting tool 110 vertically downward towards the lower cutting tool 130 increases the pressures 30, 32, 40, and 42 until fractures develop. Due to the unique microcrystalline structure of cast irons, when adequate pressure is applied to the exterior of the 2-inch cast iron pipe 20 fractures begin to develop along the graphite precipitate present in the iron matrix of the cast iron. As pressures 30, 32, 40, and 42 begin to fully develop its fractures from the indents, pressures 34, 44, and 46 begin to indent the surface of the 2-inch diameter cast iron pipe 20.

Figure 17:
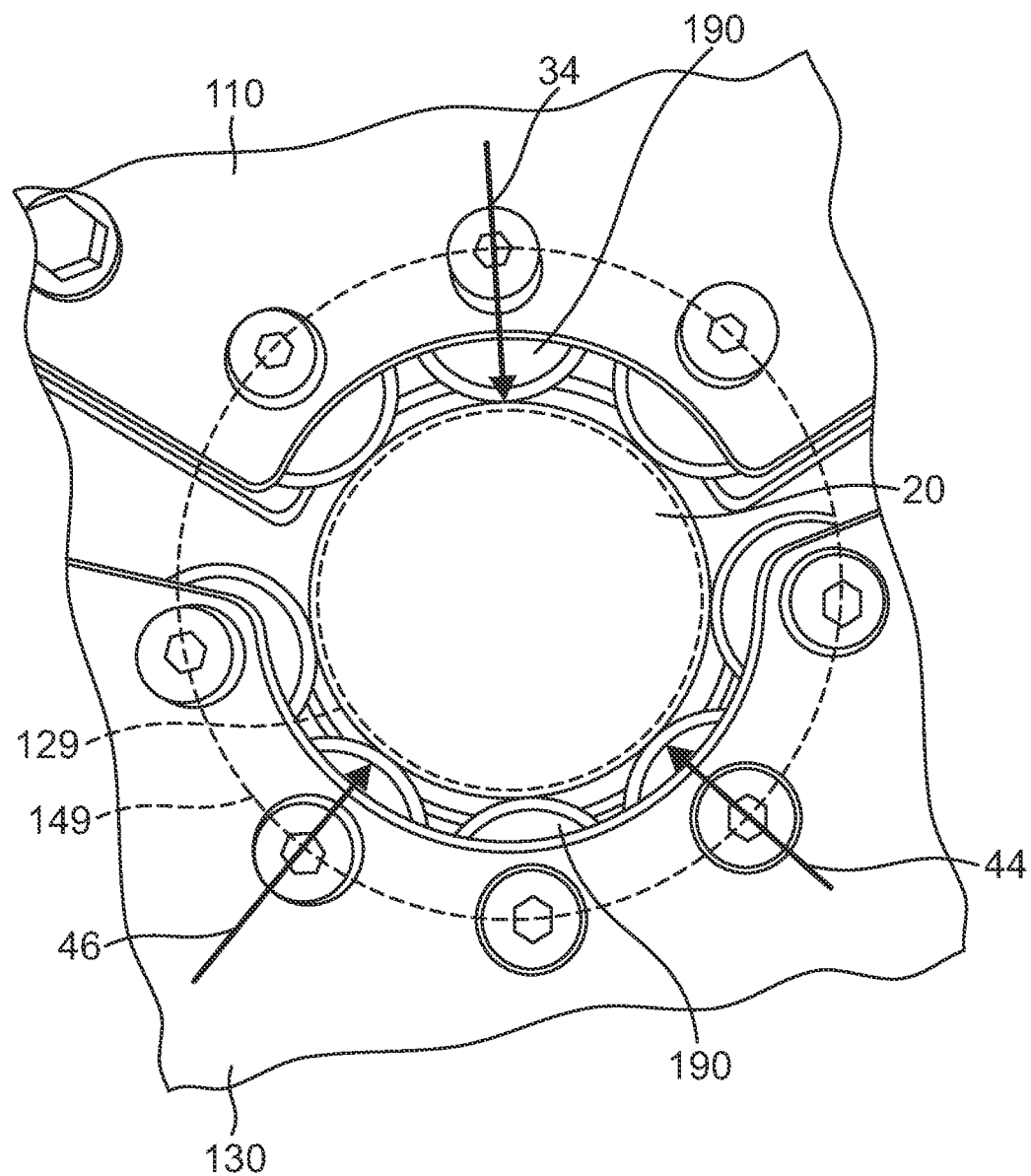
FIG. 17 is a close-up view of the upper cutting tool further advanced vertically downward towards the lower cutting tool and applying pressure at subsequent locations a distance apart.

Referring now to FIG. 17, a close-up view of the upper cutting tool 110 further advanced vertically downward towards the lower cutting tool 130 is shown. The fully developed initial fractures developed by pressures 30, 32, 40, and 42 (shown in FIG. 16) grow and amalgamate with the developing fractures created by pressures 34, 44 and 46; since the fractures developed by pressures 30, 32, 40, and 42 are fully formed, the pressures 30, 32, 40, and 42 reduce to zero. Similarly, the continued advancement of the upper cutting tool 110 vertically downward towards the lower cutting tool 130 increases the pressures 34, 44, and 46 and further indent the surface of the 2-inch diameter cast iron pipe 20 and continue to develop its fractures.

Figure 18:
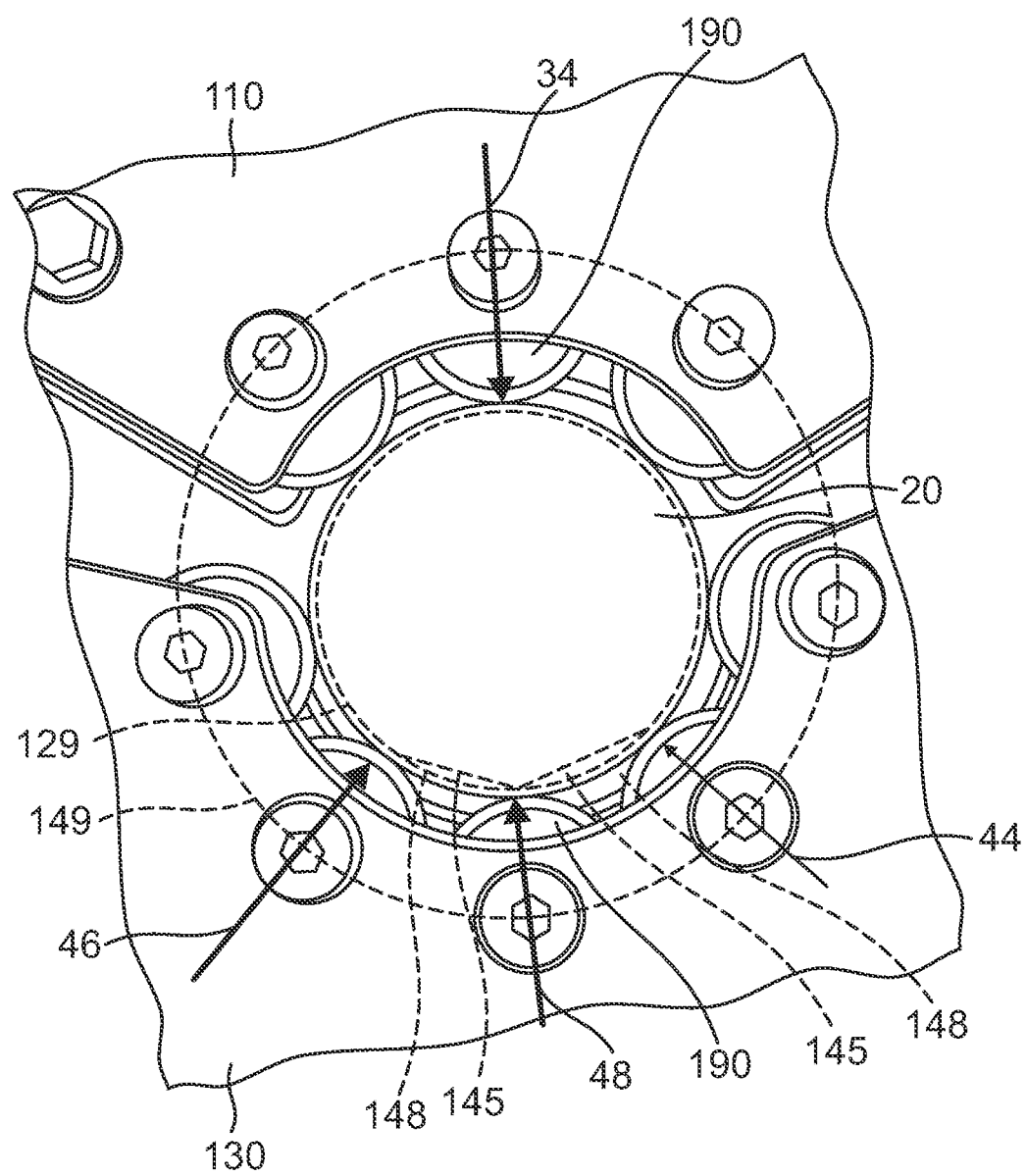
FIG. 18 is a close-up view of the upper cutting tool advanced vertically downward towards the lower cutting tool and further applying pressure at subsequent locations a distance apart.

Referring now to FIG. 18, a close-up view of the upper cutting tool 110 further advanced vertically downward towards the lower cutting tool 130 is shown. As pressures 44 and 46 begin to fully develop its fractures, the innermost cutting disc begins to apply pressure 48 at the arc length 148 and lower contact point center-to-center distance 145 inward from pressures 44 and 46. The cutting discs 190 exerting pressure 48 indents the surface of the 2-inch diameter cast iron pipe 20. The fracture created by pressure 38 is fully amalgamated with the fractures created previously by the upper cutting tool 110.

Figure 19:
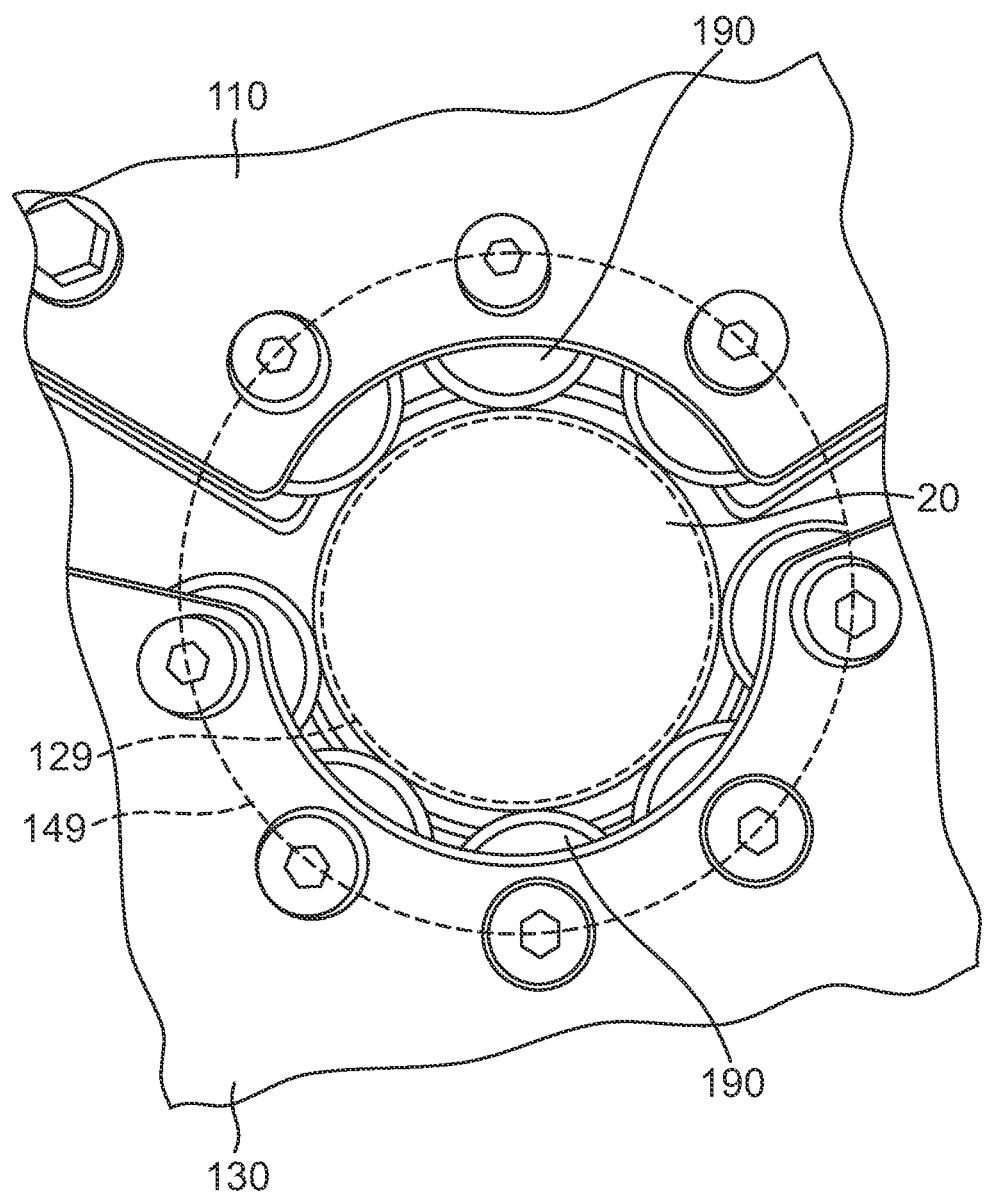
FIG. 19 is a close-up view of the upper cutting tool further advanced vertically downward towards the lower cutting tool cutting the cast iron pipe.

Referring now to FIG. 19, a close-up view of the upper cutting tool 110 further advanced vertically downward towards the lower cutting tool 130 cutting the 2-inch diameter cast iron pipe 20 is shown. The fully formed fractures developed by pressures 44 and 46 (shown in FIG. 18) grow and amalgamate with the developing fracture created by pressure 48 (shown in FIG. 18); since the fracture is fully developed by pressures 44, 46, and 48, the pressures 44, 46, and 48 reduce to zero. The creation of multiple fractures sequentially along the circumference of the 2-inch diameter cast iron pipe 20 promotes the growth of the fractures and controls the direction of the fracture growth. The multiple fractures amalgamate into a single fracture and the cast iron pipe is cut. The initiation of the initial fractures at the outermost cutting discs 190 to the sequential amalgamation of all the developed fractures for the completion of the cut occurs almost instantaneously.

As discussed herein, the hydraulic cutting tool 100 is configured to swap between the upper cutting tool 110 and the lower cutting tool 130, the upper cutting tool 110A and the lower cutting tool 130A, the upper cutting tool 110B and the lower cutting tool 130B, the upper cutting tool 110C and the lower cutting tool 130C, and the upper cutting tool 110D and the lower cutting tool 130D. The description of the formation, growth, and amalgamation of fractures for the lower cutting tool 110 and the upper cutting tool 130 configured to cut the 2-inch diameter cast iron pipe 20 described herein is applicable to all embodiments of the lower cutting tool 110 and the upper cutting tool 130 configured to cut a specific diameter cast iron pipe. The formation, growth, and amalgamation of the fractures proceed in a sequential order starting from the outermost cutting discs 190 and finishing at the innermost cutting discs 190. By creating and growing multiple fractures in a sequential order at specific arc lengths and center-to-center distances apart, the growth of the fractures are controlled so as to encourage the multiple fractures to amalgamate into a single fracture. When the multiple fractures amalgamate into a single fracture, the cast iron pipe is cut almost instantaneously at the desired location with minimal waste. The cutting process described herein is significantly faster than traditional cast iron cutting methods and can be repeated in an automated process with far greater precision than can be achieved using traditional methods.

While the cast iron pipe cutter 10 of the present invention as herein shown and disclosed in detail is fully capable of obtaining the objects and providing the advantages herein before stated, it is to be understood that it is merely illustrative of embodiments of the invention and that no limitations are intended to the details of construction or design herein shown other than as described in the appended claims.

We claim:

1. A pipe cutter compromising:
   a movable upper cutting tool positioned above a stationary lower cutting tool, the movable upper cutting tool in axial alignment with the stationary lower cutting tool along a first axis, wherein the movable upper cutting tool and the stationary lower cutting tool are configured to receive there between a length of a pipe disposed along a second axis normal to the first axis, wherein the upper cutting tool is restrained by an upper pressure plate guide to translate along the first axis towards the stationary lower cutting tool and complete a cutting of the pipe without any rotation of the movable upper cutting tool about the second axis and without any rotation of the pipe with respect to the movable upper cutting tool;
   a hydraulic press for delivering a hydraulic fluid under pressure to translate the upper movable upper cutting tool along the first axis; and
   an upper pressure plate disposed between the hydraulic press and the movable upper cutting tool, wherein the upper pressure plate receives a pressure created by the hydraulic press at a single point and applies the pressure at three evenly spaced points on the movable upper cutting tool.

2. The piper cutter of claim 1 wherein the moveable upper cutting tool and the stationary lower cutting tool each further compromise a plurality of cutting discs.

3. The piper cutter of claim 1 wherein the moveable upper cutting tool is connected to the upper pressure plate by a T-pin at each of the three evenly spaced points.

4. The piper cutter of claim 3 wherein the stationary lower cutting tool comprises a first plate and an opposite facing second plate which are attached to the lower pressure plate to prevent flexing of the stationary lower cutting tool.

5. The pipe cutter of claim 2 wherein the moveable upper cutting tool and the stationary lower cutting tool are each configured so that at least one of the cutting discs of the moveable upper cutting tool and at least one of the cutting discs of the stationary lower cutting tool simultaneously apply a pressure which is normal to an outer surface of the length of the pipe.

6. The pipe cutter of claim 2 wherein each of the plurality of cutting discs is attached to the moveable upper cutting tool with a cutting disc pin and each of the plurality of cutting discs are attached to the stationary lower cutting tool with a cutting disc pin.

7. The pipe cutter of claim 6 wherein each of the plurality of cutting discs attached to the moveable upper cutting tool rotates and each of the plurality of cutting discs attached to the stationary lower cutting tool rotates.

8. The pipe cutter of claim 2 wherein the plurality of cutting discs are locked in a stationary position.

9. The pipe cutter of claim 1 wherein the piper cutter further comprises a feeder rack, wherein the feeder rack is configured to feed a first portion of pipe into a cabinet which houses the the moveable upper cutting tool and the stationary lower cutting tool and, upon the cutting of the the first portion of pipe, which results in a cut portion of pipe, the feeder rack feeds a new portion of pipe into the cabinet, thereby forcing the cut portion of pipe out of the cabinet.

10. The pipe cutter of claim 1 wherein the piper cutter further comprises a collection tray.

11. The pipe cutter of claim 2 wherein a circle is defined by a plurality of opposite facing contact points of the cutting discs of the movable upper cutting tool with a plurality of opposite facing contact points of the cutting discs of the lower cutting tool wherein, upon translation of the moveable upper cutting tool a first distance along the first axis toward the lower cutting tool, said circle is further defined as a contact point circle, said contact point circle having a diameter smaller than an outside diameter of the pipe.

12. The piper cutter of claim 1 wherein the moveable upper cutting tool and the stationary lower cutting tool are each curved.

13. A pipe cutter compromising:
   a movable upper cutting tool positioned above a stationary lower cutting tool, the movable upper cutting tool in axial alignment with the stationary lower cutting tool along a first axis, wherein the movable upper cutting tool and the stationary lower cutting tool are configured to receive there between a length of a pipe disposed along a second axis normal to the first axis, wherein the upper cutting tool is restrained by an upper pressure plate guide to translate along the first axis towards the stationary lower cutting tool and complete a cutting of the pipe without any rotation of the movable upper cutting tool about the second axis and without any rotation of the pipe with respect to the movable upper cutting tool, wherein the movable upper cutting tool and the stationary lower cutting tool are manually removable from the pipe cutter;

a hydraulic press for delivering a hydraulic fluid under pressure to translate the movable upper cutting tool toward the stationary lower cutting tool; and a plurality of cutting discs connected to the moveable upper cutting tool and a plurality of cutting discs connected to the stationary lower cutting tool.

14. The pipe cutter of claim 13 wherein, upon the translation of the movable upper cutting tool along the first axis to a lowered position closest to the stationary lower cutting tool, a contact point circle is defined by a position of the plurality of cutting discs of the moveable upper cutting tool with respect to a position of the plurality of cutting discs of the stationary lower cutting tool, is lowered to form a wherein said contact point circle comprises a diameter which is less than an outside diameter of the length of the pipe.

15. The pipe cutter of claim 13 wherein the moveable upper cutting tool and the stationary lower cutting tool are housed within a cabinet with a shatter proof viewing window, the piper cutter further comprising a feeder rack, wherein the feeder rack is configured to feed a first portion of pipe into the cabinet and, upon the cutting of the the first portion of pipe, which results in a cut portion of pipe, the feeder rack feeds a new portion of pipe into the cabinet, thereby forcing the cut portion of pipe out of the cabinet.

16. A pipe cutter compromising:

a movable upper cutting tool positioned above a stationary lower cutting tool the movable upper cutting tool in axial alignment with the stationary lower cutting tool along a first axis, wherein the movable upper cutting tool and the stationary lower cutting tool are configured to receive there between a length of a pipe disposed along a second axis normal to the first axis, wherein the upper cutting tool is restrained by an upper pressure plate guide to translate along the first axis towards the stationary lower cutting tool and complete a cutting of the pipe without any rotation of the movable upper cutting tool about the second axis and without any rotation of the pipe with respect to the movable upper cutting tool;

a hydraulic press for delivering a hydraulic fluid under pressure to move the movable upper cutting tool toward the stationary lower cutting tool;

a plurality of cutting discs connected to the moveable upper cutting tool at an upper pressure plate and to the lower cutting tool at a lower pressure plate and a plurality of cutting discs connected to the stationary lower cutting tool;

a feeder rack for feeding a cast iron pipe to be cut; and a collection tray to receive a cut section of the cast iron pipe.

* * * * *